US012610067B2

(12) United States Patent
Xiu et al.

(10) Patent No.: US 12,610,067 B2
(45) Date of Patent: Apr. 21, 2026

(54) METHODS AND DEVICES FOR PREDICTION DEPENDENT RESIDUAL SCALING FOR VIDEO CODING

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Tsung-Chuan Ma, San Diego, CA (US); Hong-Jheng Jhu, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/976,745

(22) Filed: Oct. 28, 2022

(65) Prior Publication Data

US 2023/0067650 A1 Mar. 2, 2023

Related U.S. Application Data

(63) Continuation of application No. PCT/US2021/030358, filed on Apr. 30, 2021.

(51) Int. Cl.
*H04N 19/00* (2014.01)
*H04N 19/107* (2014.01)
(Continued)

(52) U.S. Cl.
CPC ......... *H04N 19/186* (2014.11); *H04N 19/107* (2014.11); *H04N 19/132* (2014.11)

(58) Field of Classification Search
CPC ..................................................... H04N 19/00
See application file for complete search history.

(56) References Cited

U.S. PATENT DOCUMENTS

2019/0238866 A1* 8/2019 Ström .................. H04N 19/182
2022/0060703 A1* 2/2022 Kotra ................... H04N 19/117
(Continued)

FOREIGN PATENT DOCUMENTS

WO 2019006300 A1 1/2019
WO 2019160986 A1 8/2019

OTHER PUBLICATIONS

International Search Report of PCT Application No. PCT/US2021/030358 dated Aug. 13, 2021, (3p).
(Continued)

*Primary Examiner* — Maryam A Nasri
(74) *Attorney, Agent, or Firm* — Arch & Lake LLP; Hao Tan; Shen Wang

(57) ABSTRACT

Methods and devices are provided for reducing the decoding latency introduced by luma mapping with chroma scaling (LMCS). In one method, during decoding of a coding unit (CU) that is coded by an inter mode or Combined Inter and Intra Prediction (CIIP) mode under LMCS framework, a plurality of reconstructed samples of luma component is obtained in a mapped domain, a plurality of converted samples of luma component is obtained in an original domain by converting the plurality of reconstructed samples of luma component from the mapped domain into the original domain, and the plurality of converted samples of luma component is used in the original domain, without clipping, in deriving chroma scaling factors for decoding the chroma samples of the CU.

10 Claims, 19 Drawing Sheets

(51) Int. Cl.
    *H04N 19/132*     (2014.01)
    *H04N 19/186*     (2014.01)

(56)             References Cited

U.S. PATENT DOCUMENTS

2022/0377324 A1*  11/2022  Yang ................... H04N 19/117
2023/0076920 A1*   3/2023  Chen ..................... H04N 19/50

OTHER PUBLICATIONS

Xiu, Xiaoyu, et al. "AHG16: On clipping average luma value for chroma residual scaling factor derivation", JVET-R0330, Joint Video Experts Team (JVET) of ITU-T SG 16 WP 3 and ISO/IEC JTC 1/SC 29/WG 11 18th Meeting Apr. 15-24, 2020, (3p).

Bross, Benjamin et al., "Versatile Video Coding (Draft 8)", JVET-Q2001-vE, Joint Video Experts Team JVET) of ITU-T SG 16 WP 3 and ISO/IEC JTC 1/SC 29/WG 11, 17th Meeting: Brussels, Mar. 12, 2020, (512p).

Lu, Taoran et al., "AHG16: Simplification of Reshaper Implementation", JVET-N0220, Joint Video Experts Team (JVET) of ITU-T SG 16 WP 3 and ISO/IEC JTC 1/SC 29/WG 11, 14 Meeting: Geneva, Mar. 2019, (9p).

Xiu et al. "AHG16: On clipping average luma value for chroma residual scaling factor derivation", Joint Video Experts Team (JVET) of ITU-T SG 16 WP 3 and ISO/IEC JTC 1/SC 29/WG11, Document JVET-R0330, 18th Meeting: by teleconference, Apr. 15-24, 2020, (4p).

Lu et al., "AHG16: Simplification of Reshaper Implementation", Joint Video Experts Team (JVET) of ITU-T SG 16 WP 3 and ISO/IEC JTC 1/SC 29/WG 11, Document: JVET-N0220, 14th Meeting: Geneva, CH, Mar. 19-27, 2019, (10p).

Bross et al., "Versatile Video Coding (Draft 9)" Joint Video Experts Team (JVET) of ITU-T SG 16 WP 3 and ISO/IEC JTC 1/SC 29/WG 11, Document JVET-R2001-v9, 18th Meeting: by teleconference Apr. 15, 24, 2020, (526p).

First Office Action of EP Application No. 217974476 dated Oct. 9, 2023, (7p).

First Office Action of CN Application No. 202310215815.0 dated Dec. 8, 2023 with English translation, (16p).

\* cited by examiner

Obtaining a luma prediction sample for decoding a luma residual sample.        701

Deriving a scaling factor using the luma prediction sample.        702

Using the scaling factor to scale the luma residual sample.        703

Calculating a reconstructed luma sample by adding the luma prediction sample and the scaled luma residual sample.        704

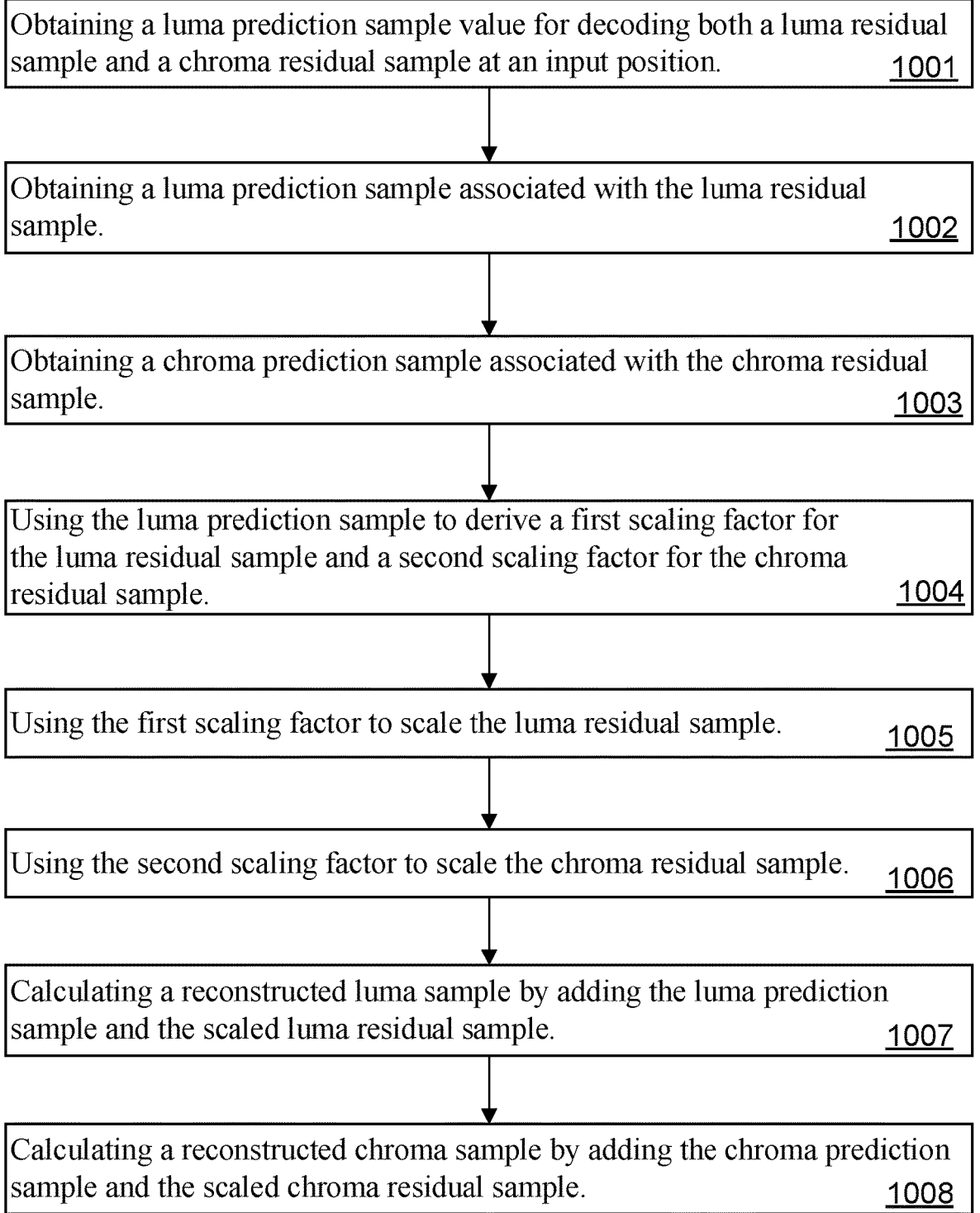

Obtaining a luma prediction sample value for decoding both a luma residual sample and a chroma residual sample at an input position.            1001

Obtaining a luma prediction sample associated with the luma residual sample.            1002

Obtaining a chroma prediction sample associated with the chroma residual sample.            1003

Using the luma prediction sample to derive a first scaling factor for the luma residual sample and a second scaling factor for the chroma residual sample.            1004

Using the first scaling factor to scale the luma residual sample.            1005

Using the second scaling factor to scale the chroma residual sample.            1006

Calculating a reconstructed luma sample by adding the luma prediction sample and the scaled luma residual sample.            1007

Calculating a reconstructed chroma sample by adding the chroma prediction sample and the scaled chroma residual sample.            1008

FIG. 10

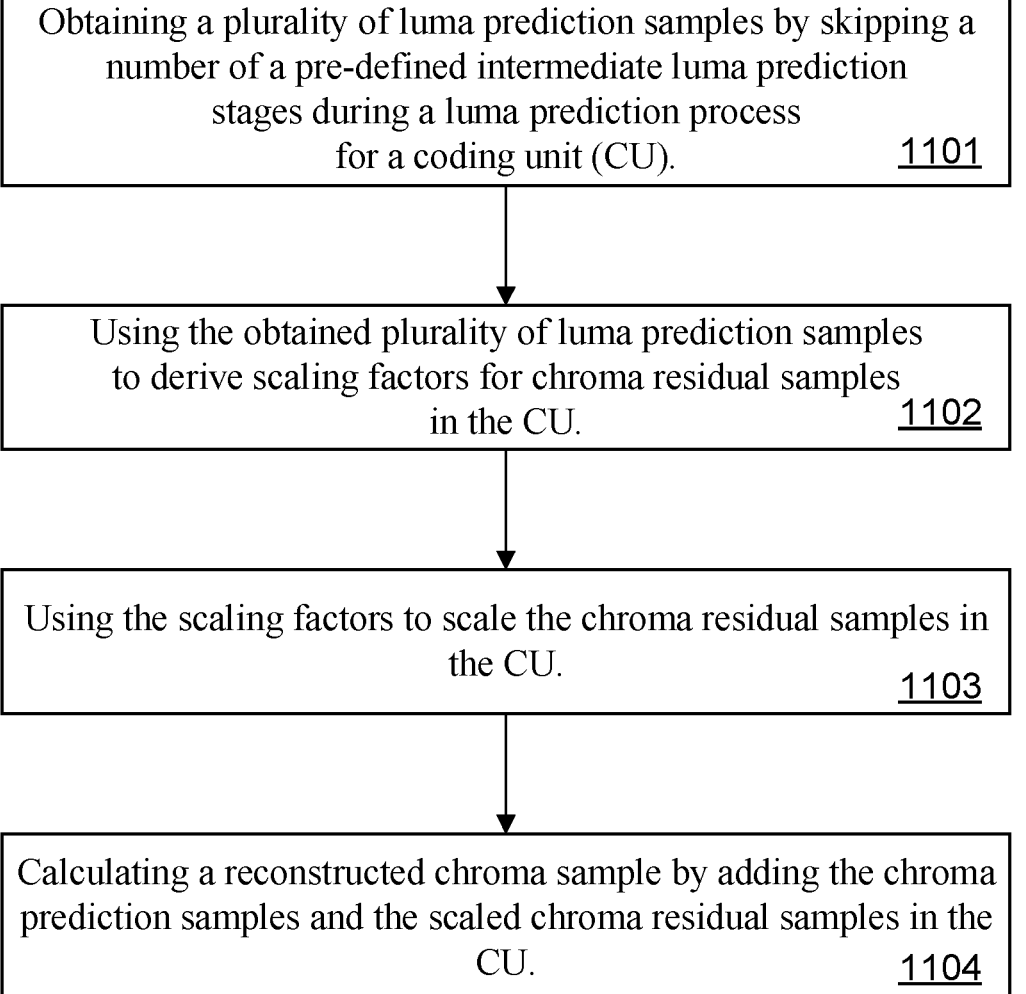

Obtaining a plurality of luma prediction samples by skipping a
number of a pre-defined intermediate luma prediction
stages during a luma prediction process
for a coding unit (CU).                                 1101

Using the obtained plurality of luma prediction samples
to derive scaling factors for chroma residual samples
in the CU.                                              1102

Using the scaling factors to scale the chroma residual samples in
the CU.
1103

Calculating a reconstructed chroma sample by adding the chroma
prediction samples and the scaled chroma residual samples in the
CU.                                                     1104

FIG. 11

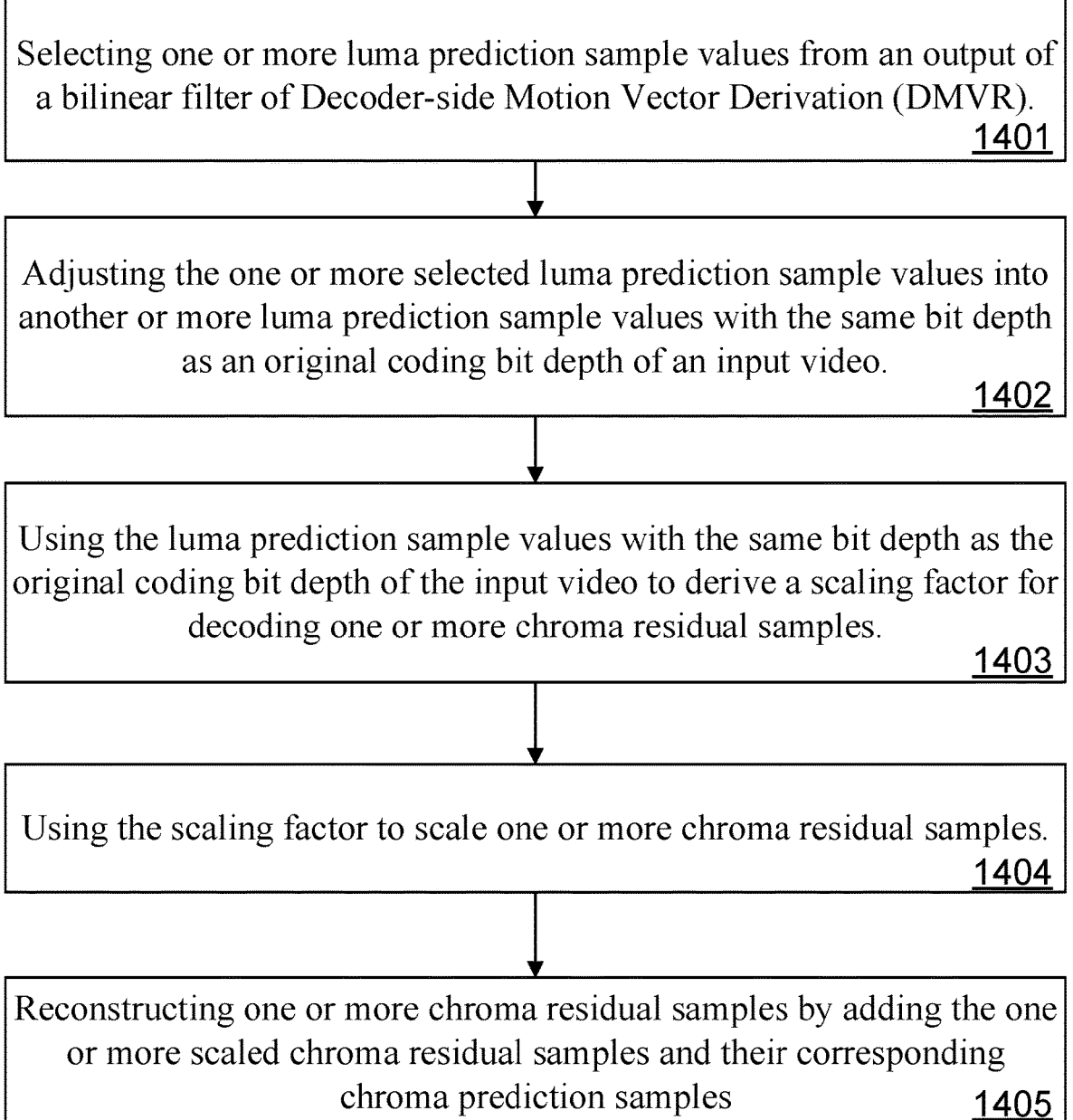

Selecting one or more luma prediction sample values from an output of a bilinear filter of Decoder-side Motion Vector Derivation (DMVR).
1401

Adjusting the one or more selected luma prediction sample values into another or more luma prediction sample values with the same bit depth as an original coding bit depth of an input video.
1402

Using the luma prediction sample values with the same bit depth as the original coding bit depth of the input video to derive a scaling factor for decoding one or more chroma residual samples.
1403

Using the scaling factor to scale one or more chroma residual samples.
1404

Reconstructing one or more chroma residual samples by adding the one or more scaled chroma residual samples and their corresponding chroma prediction samples
1405

FIG. 14

During decoding of a coding unit (CU), selecting a plurality of reconstructed luma samples from a first pre-determined region neighboring to a second pre-determined region wherein the CU is located.          1801

Calculating an average of the plurality of reconstructed luma samples.
1802

Using the average of the plurality of reconstructed luma samples directly, without any clipping, in deriving a chroma residual scaling factor for decoding the CU.          1803

FIG. 18

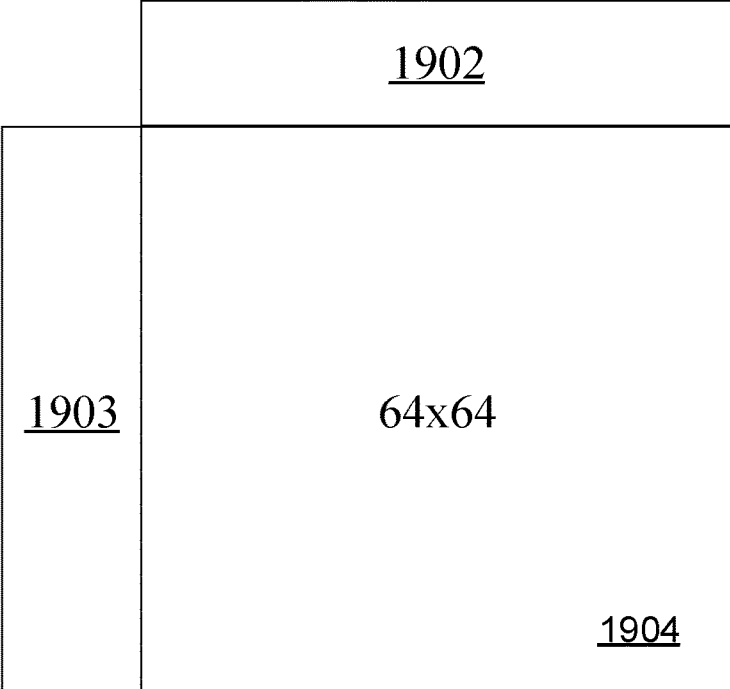

FIG. 19

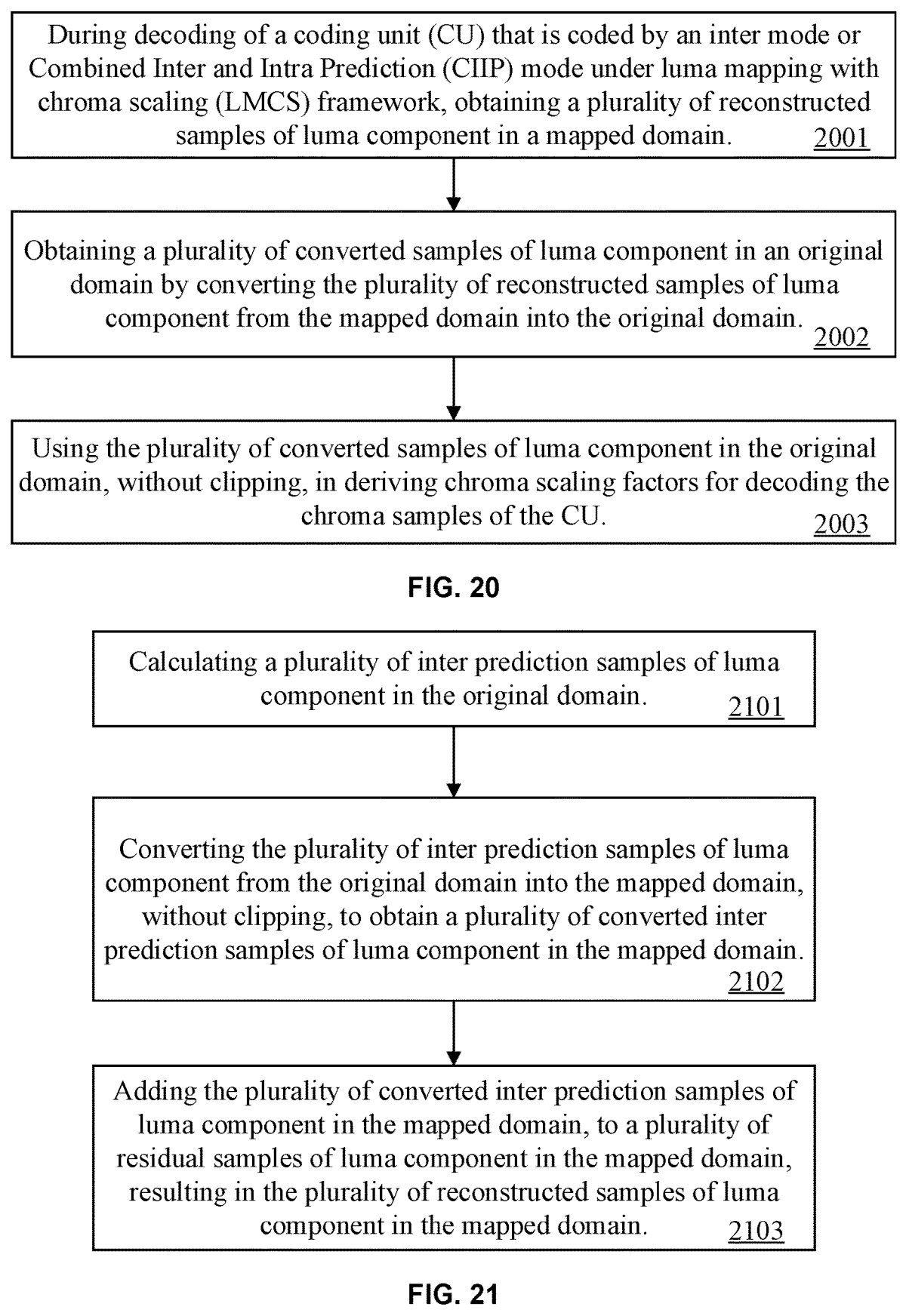

During decoding of a coding unit (CU) that is coded by an inter mode or Combined Inter and Intra Prediction (CIIP) mode under luma mapping with chroma scaling (LMCS) framework, obtaining a plurality of reconstructed samples of luma component in a mapped domain.     2001

Obtaining a plurality of converted samples of luma component in an original domain by converting the plurality of reconstructed samples of luma component from the mapped domain into the original domain.     2002

Using the plurality of converted samples of luma component in the original domain, without clipping, in deriving chroma scaling factors for decoding the chroma samples of the CU.     2003

FIG. 20

Calculating a plurality of inter prediction samples of luma component in the original domain.     2101

Converting the plurality of inter prediction samples of luma component from the original domain into the mapped domain, without clipping, to obtain a plurality of converted inter prediction samples of luma component in the mapped domain.     2102

Adding the plurality of converted inter prediction samples of luma component in the mapped domain, to a plurality of residual samples of luma component in the mapped domain, resulting in the plurality of reconstructed samples of luma component in the mapped domain.     2103

FIG. 21

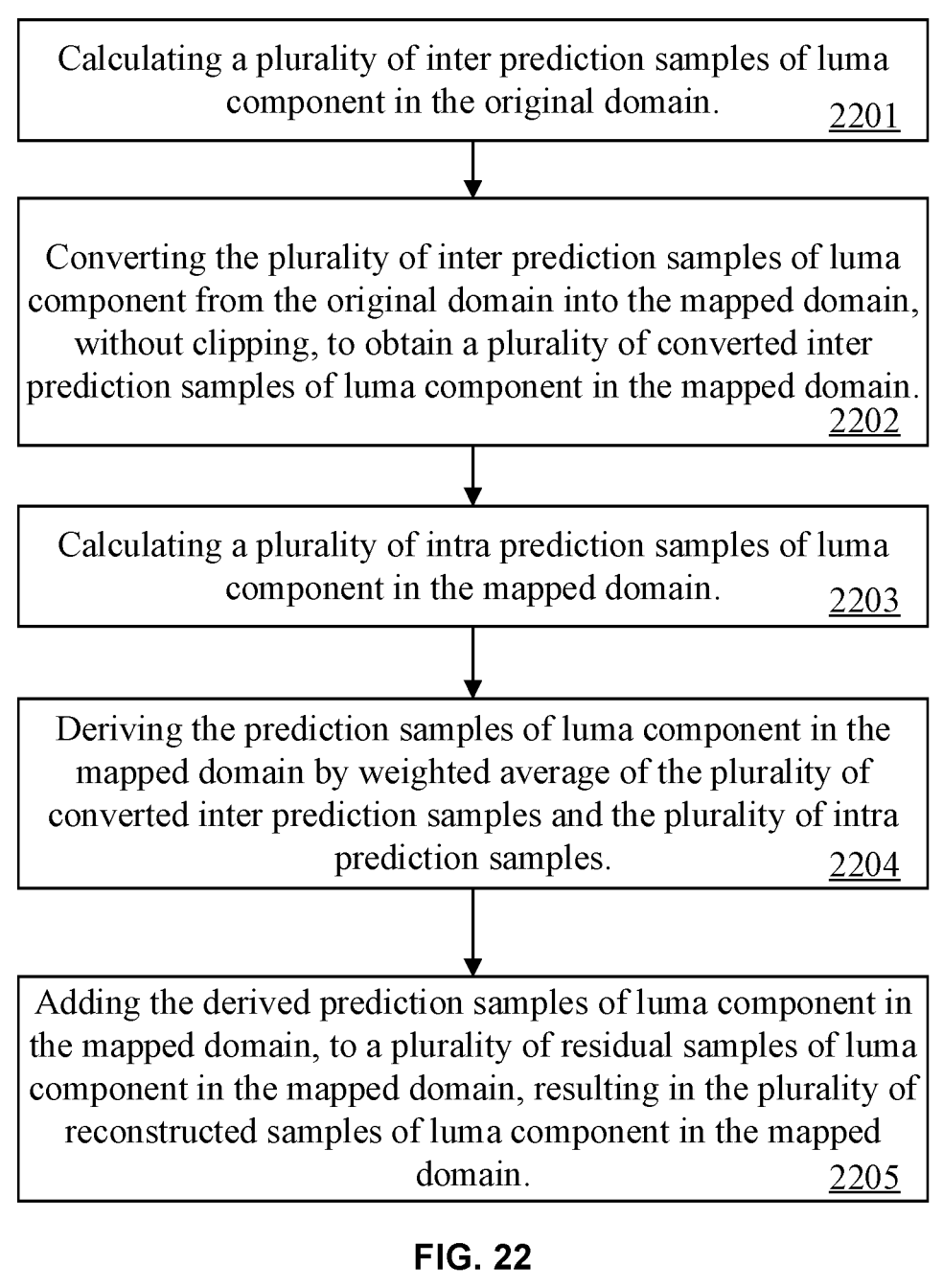

Calculating a plurality of inter prediction samples of luma component in the original domain.          2201

↓

Converting the plurality of inter prediction samples of luma component from the original domain into the mapped domain, without clipping, to obtain a plurality of converted inter prediction samples of luma component in the mapped domain.          2202

↓

Calculating a plurality of intra prediction samples of luma component in the mapped domain.          2203

↓

Deriving the prediction samples of luma component in the mapped domain by weighted average of the plurality of converted inter prediction samples and the plurality of intra prediction samples.          2204

↓

Adding the derived prediction samples of luma component in the mapped domain, to a plurality of residual samples of luma component in the mapped domain, resulting in the plurality of reconstructed samples of luma component in the mapped domain.          2205

FIG. 22

METHODS AND DEVICES FOR PREDICTION DEPENDENT RESIDUAL SCALING FOR VIDEO CODING

CROSS-REFERENCE TO RELATED APPLICATION

This application is a continuation of International Application No.: PCT/US2021/030358, filed on Apr. 30, 2021, which is based upon and claims priority to U.S. provisional patent application Ser. No. 63/018,249, filed on Apr. 30, 2020. The entire disclosure of the aforementioned application is incorporated herein by reference in their entireties for all purposes.

FIELD

The present disclosure relates generally to video coding and compression. More specifically, this disclosure relates to systems and methods for performing video coding using prediction dependent residual scaling on code units.

BACKGROUND

This section provides background information related to the present disclosure. The information contained within this section should not necessarily be construed as prior art.

Any of various video coding techniques may be used to compress video data. Video coding can be performed according to one or more video coding standards. Some illustrative video coding standards include versatile video coding (VVC), joint exploration test model (JEM) coding, high-efficiency video coding (H.265/HEVC), advanced video coding (H.264/AVC), and moving picture experts group (MPEG) coding.

Video coding generally utilizes predictive methods (e.g., inter-prediction, intra-prediction, or the like) that take advantage of redundancy inherent in video images or sequences. One goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month one reference software, called VVC test model (VTM), was established for demonstrating a reference implementation of the VVC standard.

Predictive methods utilized in video coding typically include performing spatial (intra frame) prediction and/or temporal (inter frame) prediction to reduce or remove redundancy inherent in the video data, and are typically associated with block-based video coding. Like HEVC, the VVC is built upon the block-based hybrid video coding framework In block-based video coding, the input video signal is processed block by block. For each block (also known as a coding unit (CU)), spatial prediction and/or temporal prediction may be performed. In newer video coding standards such as the now-current VVC design, blocks may be further partitioned based on a multi-type tree structure that includes not only quad-trees, but also binary and/or ternary-trees. This allows better accommodation of varying local characteristics.

Spatial prediction (also known as "intra prediction") uses pixels from the samples of already coded neighboring blocks (which are called reference samples) in the same video picture/slice to predict the current block. Spatial prediction reduces spatial redundancy inherent in the video signal.

During the decoding process, the video bit-stream is first entropy decoded at entropy decoding unit. The coding mode and prediction information are sent to either the spatial prediction unit (when intra coded) or the temporal prediction unit (when inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In newer video coding standards such as the now-current VVC design, the coding tool of luma mapping with chroma scaling (LMCS) may be applied before in-loop filtering. LMCS aims at adjusting the dynamic range of the input signal to improve the coding efficiency.

However, the now-current design of the LMCS incurs extra requirement of computation complexity and on-chip memory because it introduces redundant clipping during conversion between different domain mappings at various decoding modules.

SUMMARY

This section provides a general summary of the disclosure, and is not a comprehensive disclosure of its full scope or all of its features.

According to a first aspect of the present application, during decoding of a coding unit (CU) that is coded by an inter mode or Combined Inter and Intra Prediction (CIIP) mode under LMCS framework, a plurality of reconstructed samples of luma component is obtained in a mapped domain, a plurality of converted samples of luma component is obtained in an original domain by converting the plurality of reconstructed samples of luma component from the mapped domain into the original domain, and the plurality of converted samples of luma component is used in the original domain, without clipping, in deriving chroma scaling factors for decoding the chroma samples of the CU.

According to a second aspect of the present application, a computing device includes one or more processors, memory and a plurality of programs stored in the memory.

The programs, when executed by the one or more processors, cause the computing device to perform operations as described above in the first aspect of the present application.

According to a third aspect of the present application, a non-transitory computer readable storage medium stores a plurality of programs for execution by a computing device having one or more processors. The programs, when executed by the one or more processors, cause the computing device to perform operations as described above in the first aspect of the present application.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

FIG. 10 is a flow chart illustrating the steps of one chroma sample reconstruction procedure.

FIG. 11 is a flow chart illustrating the steps of a second chroma sample reconstruction procedure.

FIG. 14 is a flow chart illustrating the steps of one chroma residual sample reconstruction procedure.

FIG. 18 is a flow chart illustrating the steps of a non-clipping chroma residual scaling factor derivation procedure.

FIG. 19 is an illustration of the regions involved in an example of the non-clipping chroma residual scaling factor derivation procedure.

FIG. 20 is a flow chart illustrating the steps of one or more embodiments of the present disclosure.

FIG. 21 is a flow chart illustrating the steps of one or more embodiments of the present disclosure.

FIG. 22 is a flow chart illustrating the steps of other one or more embodiments of the present disclosure.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Conceptually, many video coding standards are similar, including those previously mentioned in the Background section. For example, virtually all video coding standards use block-based processing, and share similar video coding block diagrams to achieve video compression.

Figure 1:
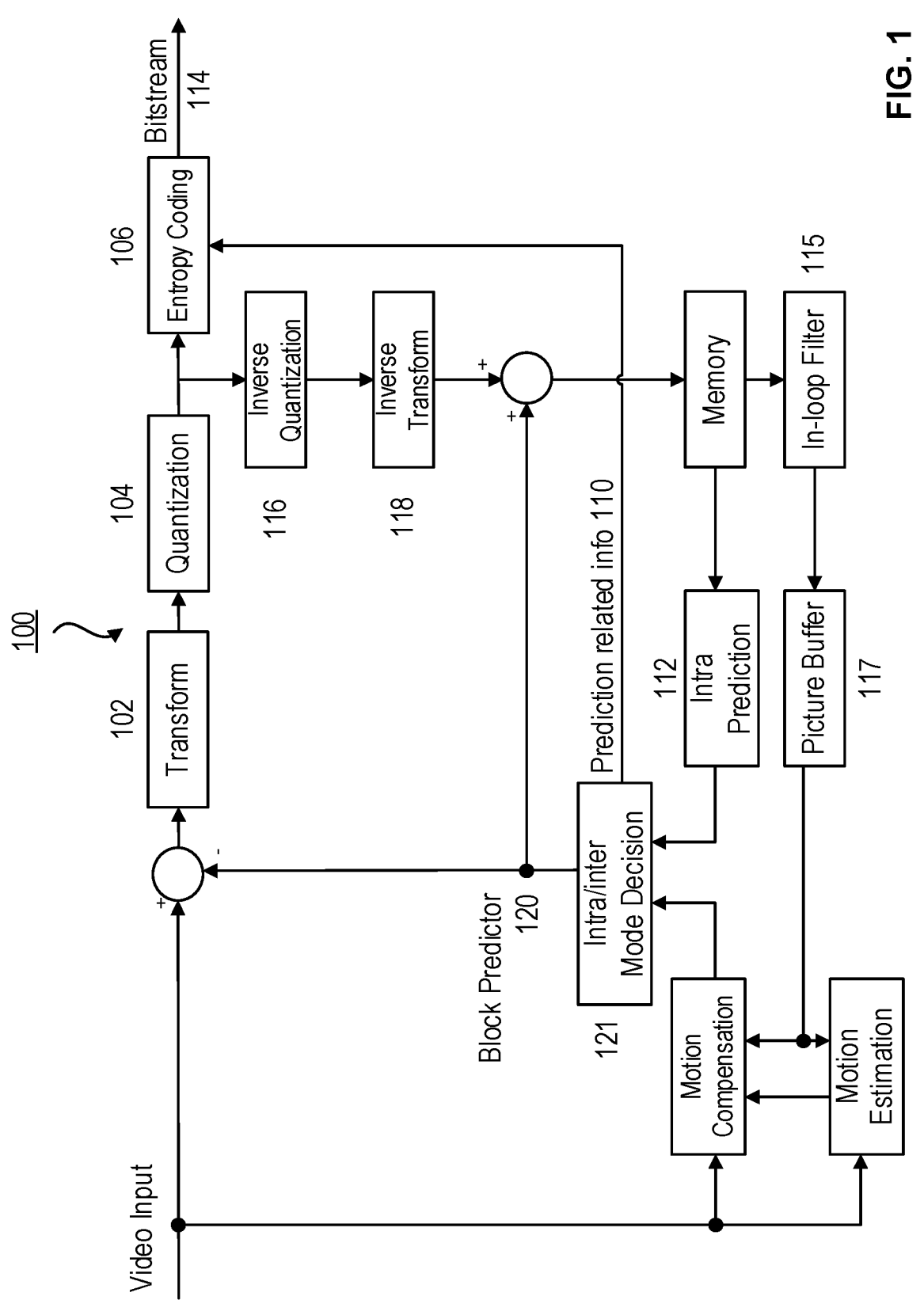
FIG. 1 is a block diagram setting forth an illustrative block-based hybrid video encoder which may be used in conjunction with many video coding standards.

FIG. 1 shows a block diagram of an illustrative block-based hybrid video encoder 100 which may be used in conjunction with many video coding standards. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Temporal prediction (also referred to as "inter prediction" or "motion compensated prediction") uses reconstructed pixels from already-coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
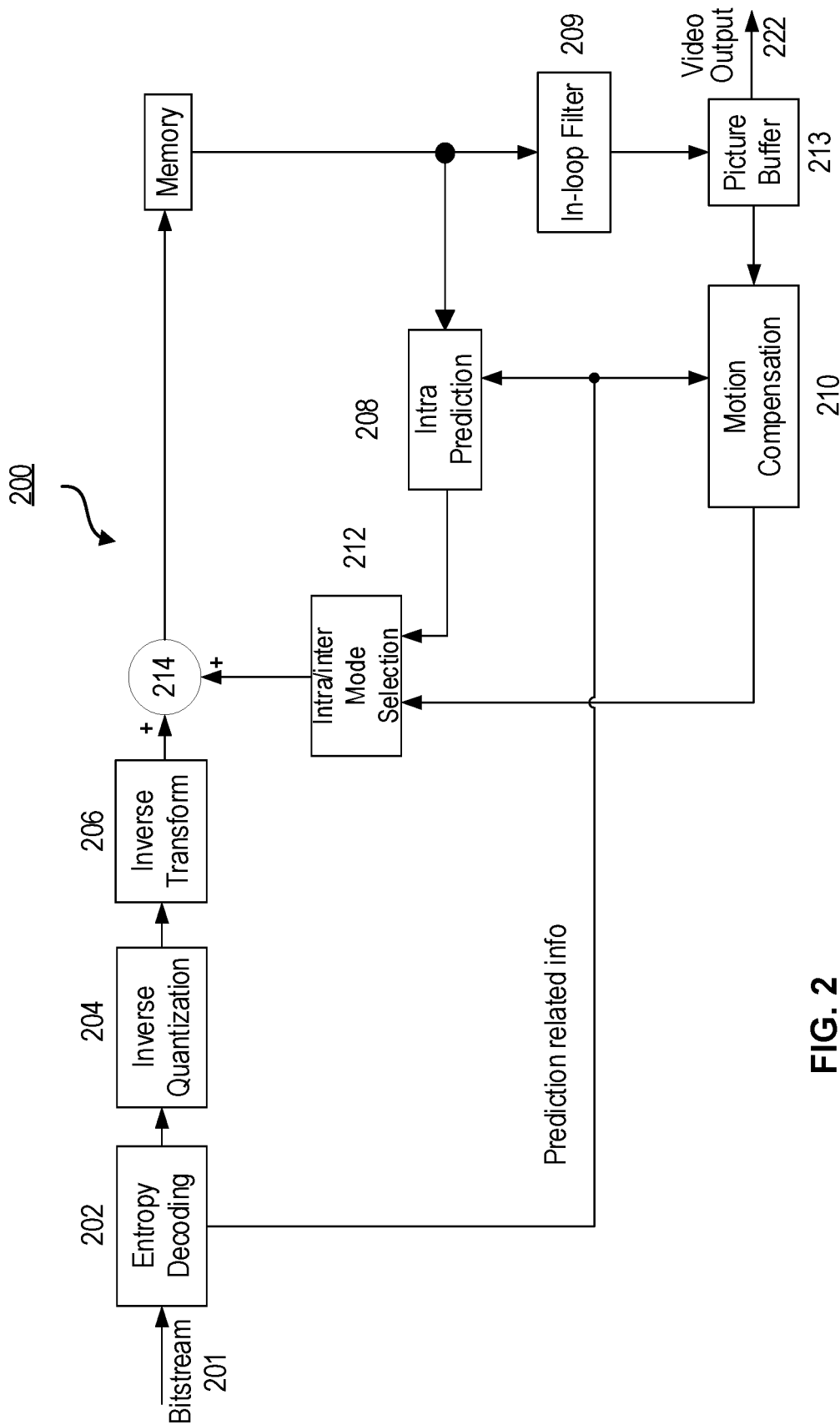
FIG. 2 is a block diagram setting forth an illustrative video decoder which may be used in conjunction with many video coding standards.

FIG. 2 is a block diagram setting forth an illustrative video decoder 200 which may be used in conjunction with many video coding standards. This decoder 200 is similar to the reconstruction-related section residing in the encoder 100 of FIG. 1. In the decoder 200 (FIG. 2), an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 can then be sent out to drive a display device, as well as used to predict future video blocks. In situations where the In-Loop Filter 209 is turned on, a filtering operation is performed on these reconstructed pixels to derive a final reconstructed Video Output 222.

In video coding standards such as HEVC, blocks may be partitioned based on quad-trees. In newer video coding standards such as the now-current VVC, more partition methods are employed, and one coding tree unit (CTU) may be split into CUs to adapt to varying local characteristics based on quad-tree, binary-tree or ternary-tree. The separation of CU, prediction unit (PU) and transform unit (TU) does not exist in most coding modes in the now-current VVC, and each CU is always used as the basic unit for both prediction and transform without further partitions. However, in some specific coding modes such as intra subpartition coding mode, each CU may still contain multiple TUs. In the multi-type tree structure, one CTU is firstly partitioned by a quad-tree structure. Then, each quad-tree leaf node can be further partitioned by a binary and ternary tree structure.

Figure 3:
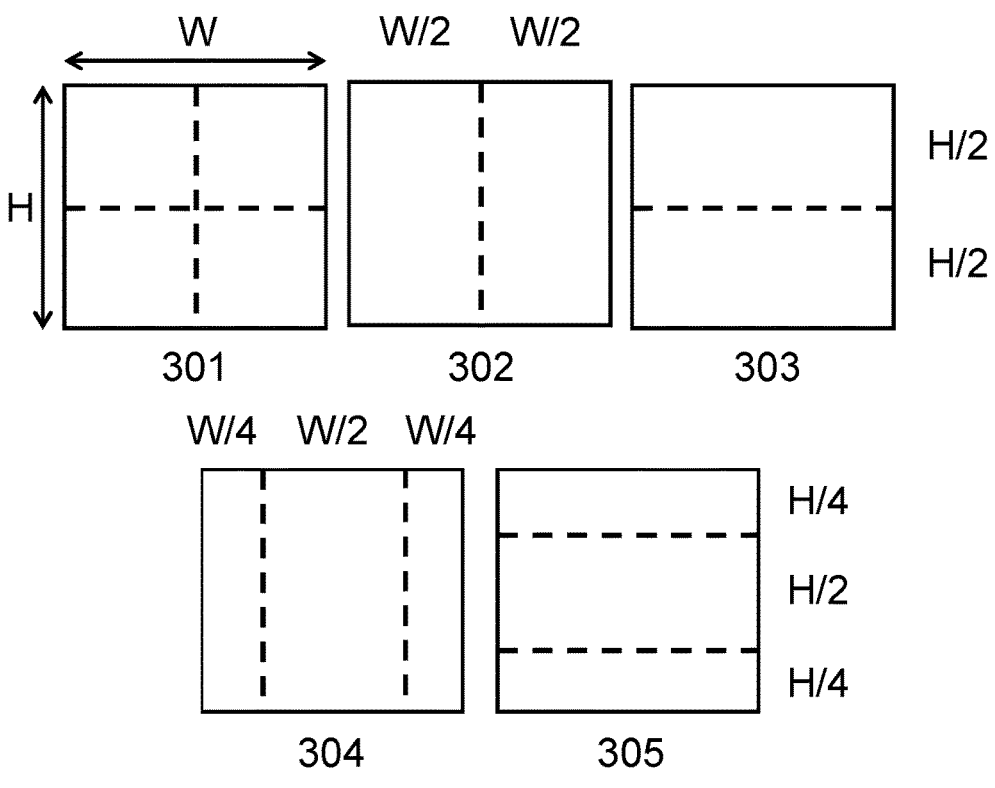
FIG. 3 is an illustration of block partitions in a multi-type tree structure which may be used in conjunction with many video coding standards.

FIG. 3 shows the five splitting types employed in the now-current VVC, namely, quaternary partitioning 301, horizontal binary partitioning 302, vertical binary partitioning 303, horizontal ternary partitioning 304, and vertical ternary partitioning 305. In situations where a multi-type tree structure is utilized, one CTU is first partitioned by a quad-tree structure. Then, each quad-tree leaf node can be further partitioned by a binary and ternary tree structure.

Using one or more of the exemplary block partitionings 301, 302, 303, 304, or 305 of FIG. 3, spatial prediction and/or temporal prediction may be performed using the configuration shown in FIG. 1. Spatial prediction (or "intra prediction") uses pixels from the samples of already-coded neighboring blocks (which are called reference samples) in the same video picture/slice to predict the current video block. Spatial prediction reduces spatial redundancy inherent in the video signal.

In newer video coding standards such as the now-current VVC, a new coding tool, Luma Mapping with Chroma Scaling (LMCS) has been added. The LMCS is added as one new coding tool that is applied before the loop filters (e.g., the de-blocking filter, the SAO and the ALF).

In general, the LMCS has two main modules: first, in-loop mapping of the luma component based on adaptive piece-wise linear models; and second, luma-dependent chroma residual scaling.

Figure 4:
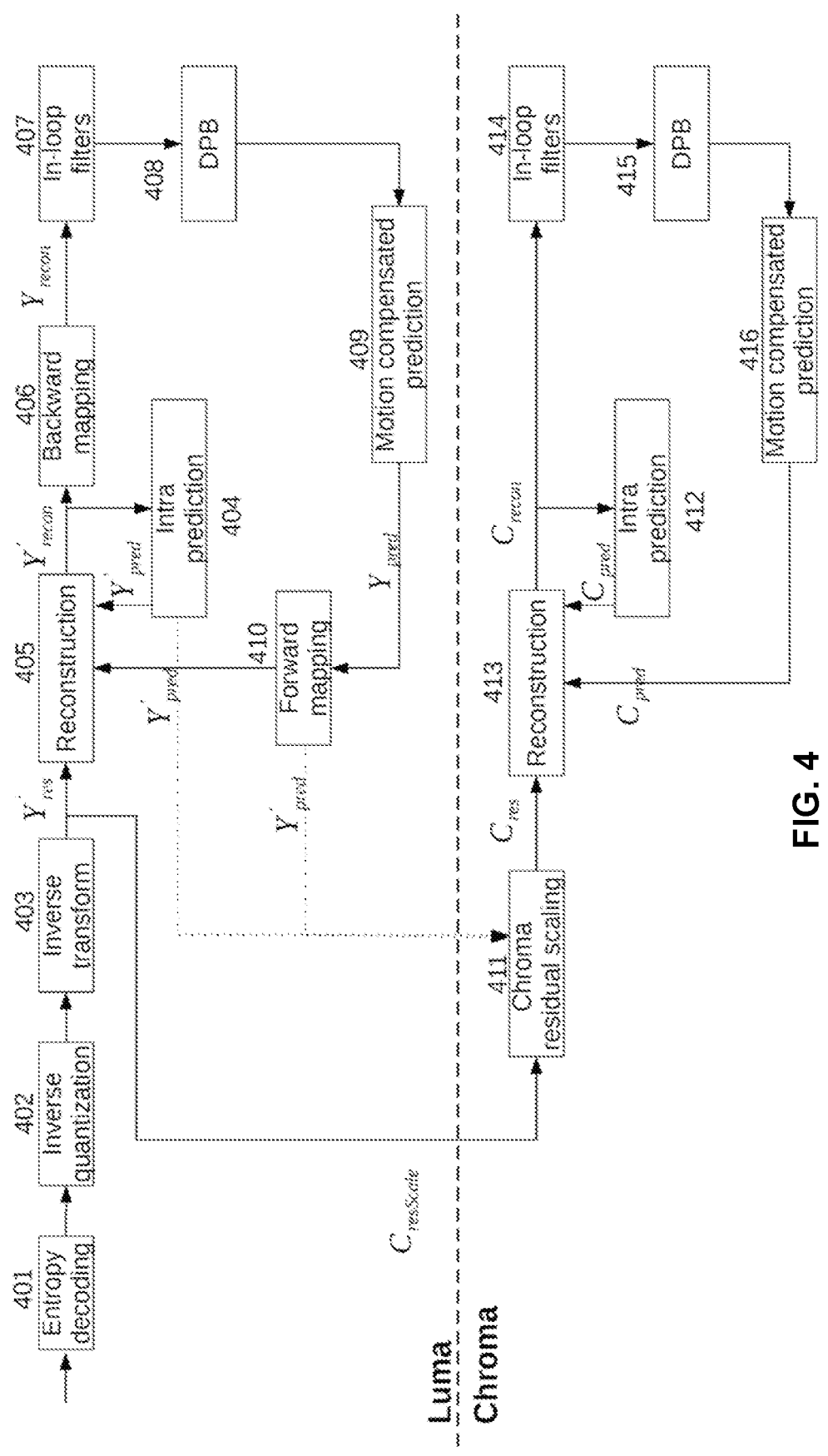
FIG. 4 is a flow chart illustrating the decoding process with LMCS being applied.

FIG. 4 shows the modified decoding process with the LMCS being applied. In FIG. 4, certain blocks represent the decoding modules that are conducted in the mapped domain, which include entropy decoding 401, inverse quantization 402, inverse transform 403, luma intra prediction 404 and luma sample reconstruction 405 (i.e., the addition of the luma prediction samples $Y'_{pred}$ and the luma residual samples $Y'_{res}$ to produce the reconstructed luma sample $Y'_{recon}$). Certain other blocks indicate the decoding modules that are conducted in the original (i.e., non-mapped) domain, which include motion compensated prediction 409, chroma intra prediction 412, chroma sample reconstruction 413 (i.e., the addition of the chroma prediction samples $C_{pred}$ and the chroma residual samples $C_{res}$ to produce the reconstructed chroma sample $C_{recon}$) and the in-loop filter process 407 (encompassing the deblocking, the SAO and the ALF). A further group of blocks represent the new operational modules introduced by the LMCS, including forward mapping 410 and inverse (or backward) mapping 406 of luma samples, and chroma residual scaling 411. In addition, as shown in FIG. 4, all the reference pictures that are stored in decoded picture buffer (DPB) 408 (for luma) and 415 (for chroma) are in the original domain.

The in-loop mapping of the LMCS aims at adjusting the dynamic range of the input signal to improve the coding efficiency. The in-loop mapping of the luma samples in the existing LMCS design is built upon two mapping functions, one forward mapping function FwdMap and one corresponding inverse mapping function InvMap. The forward mapping function is signaled from encoder to decoder using one piecewise linear model with 16 equal-size pieces. The inverse mapping function can be directly derived from the forward mapping function and therefore does not need to be signaled.

The parameters of luma mapping model are signaled at slice level. A presence flag is firstly signaled to indicate if luma mapping model is to be signaled for a current slice. If luma mapping model is present in the current slice, the corresponding piecewise linear model parameters are further signaled. Based on the piecewise linear model, the input signal's dynamic range is partitioned into 16 segments with equal size in the original domain, and each segment is mapped to a corresponding segment. For a given segment in the original domain, its corresponding segment in the mapped domain may have the same or a different size. The size of each segment in the mapped domain is indicated by the number of codewords (i.e., the mapped sample values) of that segment. For each segment in the original domain, linear mapping parameters can be derived based on the number of codewords in its corresponding segment in the mapped domain. For example, when the input is in 10-bit depth, each of the 16 segments in the original domain has 64 pixel values, if each of the segments in the mapped domain also has 64 codewords assigned to it, it indicates a simple one-to-one mapping (i.e. a mapping with each sample value unchanged). The signaled number of codewords for each segment in the mapped domain is used to calculate the scaling factor and adjust the mapping function accordingly for that segment. Additionally, at slice level, another LMCS control flag is signaled to enable/disable the LMCS for the slice.

For each segment, the corresponding piece-wise linear model is defined as described in the box immediately following this paragraph:

---

For the i-th segment, i = 0 ... 15, the corresponding piece-wise linear model is defined by two input pivot points InputPivot[i] and InputPivot[i+1], and two output (mapped) pivot points MappedPivot[i] and MappedPivot[i+1]. Further, assuming 10-bit input video, the values of InputPivot[i] and MappedPivot[i], i = 0 ... 15, are calculated as follows:
   1. Set the variable OrgCW = 64
   2. For i = 0:16, InputPivot[ i ] = i * OrgCW
   3. For i=0:16, MappedPivot[i] is calculated as follows:
     MappedPivot[ 0 ] = 0;
     for( i = 0; i <16 ; i++)
       MappedPivot[ i + 1 ] = MappedPivot[ i ] + SignaledCW[ i ]
where SignaledCW[i] is the signaled number of codewords for the i-th segment.

---

As illustrated in FIG. 4, there is a need of operating in two different domains during the LMCS process. For each CU coded through an inter-prediction mode (an "inter CU"), its motion compensated prediction is performed in the original domain. However, because the reconstruction of the luma component (i.e., the addition of the luma prediction samples and the luma residual samples) is carried out in the mapped domain, the motion compensated luma prediction $Y_{pred}$ needs to be mapped from the original domain to the value $Y'_{pred}$ in the mapped domain through the forward mapping function 410, i.e., $Y'_{pred}=\text{FwdMap}(Y_{pred})$, before $Y'_{pred}$ is used for pixel reconstruction 405. On the other hand, for each CU coded through an intra-prediction mode (an "intra CU"), the mapping of the prediction samples is not needed given that the intra prediction 404 is performed in the mapped domain (as shown in FIG. 4) before $Y'_{pred}$ is used for pixel reconstruction 405. Finally, after generating the reconstructed luma samples $Y'_{recon}$, the backward mapping function 406 is applied to convert the reconstructed luma samples $Y'_{recon}$ back to a value $Y_{recon}$ in the original domain before proceeding into the luma DPB 408, i.e., $Y_{recon}=\text{InvMap}(Y'_{recon})$. Unlike the forward mapping 410 of the prediction samples which only needs to be applied for inter CUs, the backward mapping 406 of the reconstructed samples needs to be applied to both inter and intra CUs.

To sum up, at decoder side, the in-loop luma mapping of the now-current LMCS is conducted in such a way that the luma prediction samples $Y_{pred}$ are firstly converted to the mapped domain if needed: Y'pred=FwdMap(Ypred). Then the mapped prediction samples are added with the decoded luma residuals to form the reconstructed luma samples in the mapped domain: Y'recon=Y'pred+Y'res. Finally, the inverse mapping is applied to convert the reconstructed luma samples Y'recon back to the original domain: Yrecon=InvMap(Y'recon). At encoder side, because the luma residuals are coded in the mapped domain, they are generated as the difference between the mapped luma original samples and the mapped luma prediction samples: Y'res=FwdMap(Yorg)−FwdMap(Ypred).

The second step of the LMCS, luma-dependent chroma residual scaling, is designed to compensate for the interaction of quantization precision between the luma signal and its corresponding chroma signals when the in-loop mapping is applied to the luma signal. Whether chroma residual scaling is enabled or disabled is also signaled in the slice header. If luma mapping is enabled and if dual-tree partition of luma and chroma components is disabled for the current slice, an additional flag is signaled to indicate if luma-dependent chroma residual scaling is applied or not. When luma mapping is not used, or when dual-tree partition is enabled for the current slice, luma-dependent chroma residual scaling is always disabled. Additionally, chroma residual scaling is always disabled for the CUs that contain less than or equal to four chroma samples.

For both intra and inter CUs, the scaling parameters that are used to scale chroma residual are dependent on the average of the corresponding mapped luma prediction samples. The scaling parameters are derived as described in the box immediately following this paragraph:

---

Denote avg'$_Y$ as the average of the luma prediction samples in the mapped domain. The scaling parameter C$_{ScaleInv}$ is computed according to the following steps:
1. Find the segment index Y$_{Idx}$ of the piecewise linear model to which avg'$_Y$ belongs to in the mapped domain. Here Y$_{Idx}$ has an integer value ranging from 0 to 15.
2. C$_{ScaleInv}$ = cScaleInv[Y$_{Idx}$], where cScaleInv[i], i = 0 ... 15, is a pre-computed 16-piece look-up table (LUT).

Because the intra prediction is performed in the mapped domain in the LMCS, for the CUs that are coded as intra, combined intra and inter prediction (CIIP), or intra block copy (IBC) modes, avg'$_Y$ is computed as the average of the luma prediction samples; otherwise, avg'$_Y$ is computed as the average of the forward mapped inter predicted luma samples.

---

FIG. 4 also illustrates the computation of the average of luma prediction samples for luma-dependent chroma residual scaling. For inter CUs, the forward-mapped luma prediction Y'$_{pred}$ is fed together with the scaled chroma residuals C$_{resScale}$ into chroma residual scaling 411 to derive the chroma residuals C$_{res}$, which is fed into chroma reconstruction 413 together with chroma predictions C$_{pred}$, in order to derive reconstructed chroma values C$_{recon}$. For intra CUs, intra prediction 404 produces Y'$_{pred}$, which is already in mapped domain, and it is fed into chroma residual scaling 411 in similar fashion as for inter CUs.

Unlike the luma mapping which is performed on the sample basis, C$_{ScaleInv}$ is fixed for the entire chroma CU. Given C$_{ScaleInv}$, chroma residual scaling is applied as described in the box immediately following this paragraph.

---

Encoder side: C$_{ResScale}$ = C$_{Res}$/C$_{ScaleInv}$
Decoder side: C$_{Res}$ = C$_{ResScale}$ * C$_{ScaleInv}$
Where C$_{ResScale}$ and C$_{Res}$ represent the original and the scaled chroma residual sample values, respectively.

---

In newer video coding standards such as the now-current VVC, new coding tools have been introduced, and some examples of the new coding tools are: Bi-Directional Optical Flow (BDOF), Decoder-side Motion Vector Refinement (DMVR), Combined Inter and Intra Prediction (CIIP), Affine Mode, and Prediction Refinement with Optical Flow (PROF) for affine mode.

In the now-current VVC, bi-directional optical flow (BDOF) is applied to refine the prediction samples of bi-predicted coding blocks.

Figure 5:
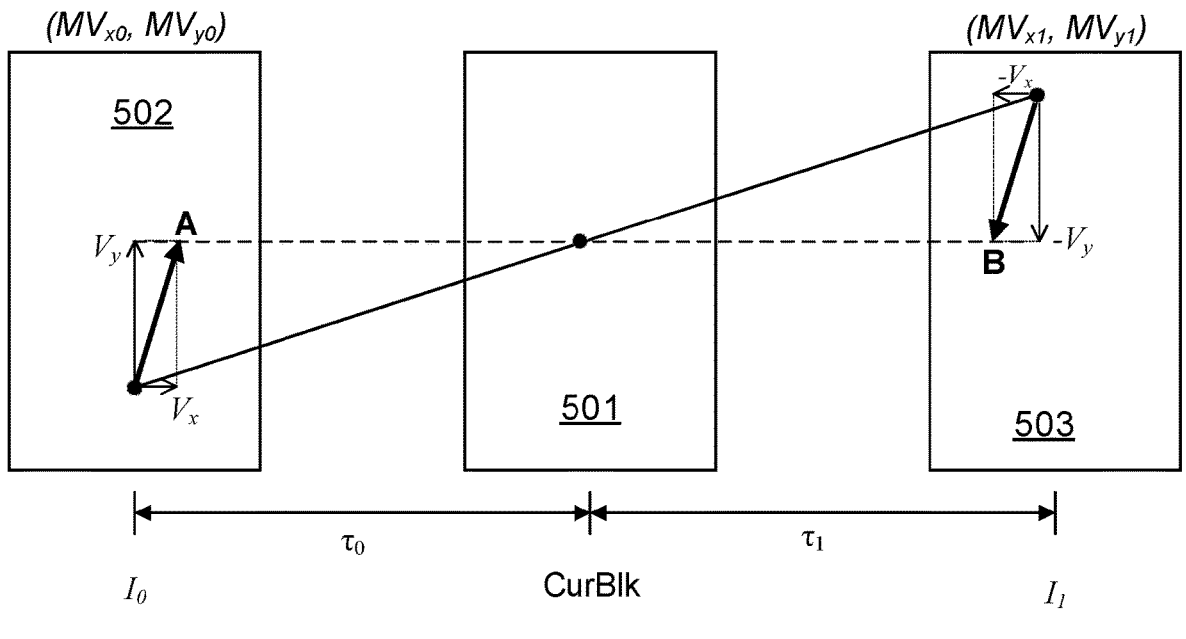
FIG. 5 is an illustration of the BDOF process.

FIG. 5 is an illustration of the BDOF process. The BDOF is sample-wise motion refinement that is performed on top of the block-based motion-compensated predictions when bi-prediction is used. The motion refinement ($v_x$, $v_y$) of each 4×4 sub-block 501 is calculated by minimizing the difference between reference picture list 0 (L0) and reference picture list 1 (L1) prediction samples 502 and 503 after the BDOF is applied inside one 6×6 window 22 around the sub-block.

Specifically, the value of motion refinement ($v_x$, $v_y$) is derived as described in the box immediately following this paragraph.

$$v_x = S_1 > 0 ?\ \mathrm{clip3}\big(-th_{BDOF},\ th_{BDOF},\ -\big((S_3 \cdot 2^3) \gg \lfloor \log_2 S_1 \rfloor\big)\big):\ 0$$

$$v_y = S_5 > 0 ?\ \mathrm{clip3}\big(-th_{BDOF},\ th_{BDOF},\ -$$

$$\big((S_6 \cdot 2^3 - ((v_x S_{2,m}) \ll n_{S_2} + v_x S_{2,s})/2) \gg \lfloor \log_2 S_5 \rfloor\big)\big):\ 0$$

where $\lfloor \cdot \rfloor$ is the floor function; clip3(min, max, $x$) is a function that clips a given value $x$ inside the range of [min, max];

the symbol $\gg$ represents bitwise right shift operation;

the symbol $\ll$ represents bitwise left shift operation;

$th_{BDOF}$ is the motion refinement threshold to prevent the propagated errors due to irregular local motion, which is equal to $1 \ll \max(5, \mathrm{bitDepth} - 7)$, where bitDepth is the internal bitdepth. Moreover, $$S_{2,m} = S_2 \gg n_{S_2},\ S_{2,s} = S_2\ \&\ (2^{n_{S_2}} - 1).$$

The values $S_1$, $S_2$, $S_3$, $S_5$ and $S_6$ in the box immediately above are further calculated as described in the box immediately following this paragraph.

$$S_1 = \sum\nolimits_{(i,j)\in\Omega} \psi_x(i,j)\cdot\psi_x(i,j),$$

$$S_2 = \sum\nolimits_{(i,j)\in\Omega} \psi_x(i,j)\cdot\psi_x(i,j),$$

$$S_3 = \sum\nolimits_{(i,j)\in\Omega} \psi_x(i,j)\cdot\psi_x(i,j),$$

$$S_5 = \sum\nolimits_{(i,j)\in\Omega} \psi_x(i,j)\cdot\psi_x(i,j),$$

$$S_6 = \sum\nolimits_{(i,j)\in\Omega} \psi_x(i,j)\cdot\psi_x(i,j),$$

where $$\psi_x(i,j) = \left(\frac{\partial I^{(1)}}{\partial x}(i,j) + \frac{\partial I^{(0)}}{\partial x}(i,j)\right) \gg \max(1, \mathrm{bitdepth} - 11)$$

$$\psi_y(i,j) = \left(\frac{\partial I^{(1)}}{\partial y}(i,j) + \frac{\partial I^{(0)}}{\partial y}(i,j)\right) \gg \max(1, \mathrm{bitdepth} - 11)$$

$$\theta(i,j) =$$

$$\big(I^{(1)}(i,j) \gg \max(4, \mathrm{bitdepth} - 8)\big) - \big(I^{(0)}(i,j) \gg \max(4, \mathrm{bitdepth} - 8)\big)$$

The values $I^{(k)}$(i,j) in the box immediately above are the sample value at coordinate (i,j) of the prediction signal in list k, k=0,1, which are generated at intermediate high $$\frac{\partial I^{(k)}}{\partial x}(i,j) = \big(I^{(k)}(i+1,j) - I^{(k)}(i-1,j)\big) \gg \max(6, \mathrm{bitdepth} - 6)$$

$$\frac{\partial I^{(k)}}{\partial y}(i,j) = \big(I^{(k)}(i,j+1) - I^{(k)}(i,j-1)\big) \gg \max(6, \mathrm{bitdepth} - 6)$$

precision (i.e., 16-bit); and the values $$\frac{\partial I^{(k)}}{\partial x}(i, j) \text{ and } \frac{\partial I^{(k)}}{\partial y}(i, j)$$

are the horizontal and vertical gradients of the sample that are obtained by directly calculating the difference between its two neighboring sample. The values $$\frac{\partial I^{(k)}}{\partial x}(i, j) \text{ and } \frac{\partial I^{(k)}}{\partial y}(i, j)$$

are calculated as described in the box immediately following this paragraph.

Based on the derived motion refinement derived in Equation 1 above, the final bi-prediction samples of the CU are calculated by interpolating the L0/L1 prediction samples along the motion trajectory based on the optical flow model, as indicated in the box immediately following this paragraph.

Based on the bit-depth control method described above, it is guaranteed that the maximum bit-depth of the intermediate parameters of the whole BDOF process do not exceed 32-bit and the largest input to the multiplication is within 15-bit, i.e., one 15-bit multiplier is $$pred_{BDOF}(x, y) = \left(I^{(0)}(x, y) + I^{(1)}(x, y) + b + o_{offset}\right) \gg \text{shift}$$

$$b = rnd\left(\left(v_x\left(\frac{\partial I^{(1)}(x, y)}{\partial x} - \frac{\partial I^{(0)}(x, y)}{\partial x}\right)\right)/2\right) +$$

$$rnd\left(\left(v_y\left(\frac{\partial I^{(1)}(x, y)}{\partial y} - \frac{\partial I^{(0)}(x, y)}{\partial y}\right)\right)/2\right)$$

where shift and $o_{offset}$ are the right shift value and the offset value that are applied to combine the $L0$ and $L1$ prediction signals for bi-prediction, which are equal to $15 - BD$ and $1 \ll (14 - BD) +$ $2 \cdot (1 \ll 13)$, respectively.

sufficient tor BDOF implementations.

DMVR is a bi-prediction technique used for merge blocks with two initially signaled MVs that can be further refined by using bilateral matching prediction.

Specifically, in DMVR, the bilateral matching is used to derive motion information of the current CU by finding the best match between two blocks along the motion trajectory of the current CU in two different reference pictures. The cost function used in the matching process is row-subsampled SAD (sum of absolute difference). After the matching process is done, the refined MVs are used for motion compensation in the prediction stage, temporal motion vector prediction for subsequent picture and unrefined MVs are used for the motion vector prediction between the motion vector of the current CU and that of its spatial neighbors.

Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

In the now-current VVC, inter and intra prediction methods are used in the hybrid video coding scheme, where each PU is only allowed to select inter prediction or intra prediction for exploiting the correlation in either temporal or spatial domain while never in both. However, as pointed out in previous literature, the residual signal generated by inter-predicted blocks and intra-predicted blocks could present very different characteristics from each other. Therefore, if the two kinds of predictions can be combined in an efficient way, one more accurate prediction can be expected for reducing the energy of prediction residual and therefore improving the coding efficiency. Additionally, in nature video content, the motion of moving objects could be complicated. For example, there could exist areas which contain both old content (e.g., the objects that are included in previously coded pictures) and emerging new content (e.g., the objects that are excluded in previously coded pictures). In such scenario, neither inter prediction or intra prediction can provide one accurate prediction of current block.

To further improve the prediction efficiency, combined inter and intra prediction (CIIP), which combines the intra prediction and the inter prediction of one CU that is coded by merge mode, is adopted in the VVC standard. Specifically, for each merge CU, one additional flag is signaled to indicate whether the CIIP is enabled for the current CU. When the flag is equal to one, the CIIP only applies the planar mode to generate the intra predicted samples of luma and chroma components. Additionally, equal weight (i.e., 0.5) is applied to average the inter prediction samples and the intra prediction samples as the final prediction samples of the CIIP CU.

VVC also supports Affine Mode for motion compensated prediction. In HEVC, only translation motion model is applied for motion compensated prediction. While in the real world, there are many kinds of motion, e.g. zoom in/out, rotation, perspective motions and other irregular motions. In the VVC, affine motion compensated prediction is applied by signaling one flag for each inter coding block to indicate whether the translation motion or the affine motion model is applied for inter prediction. In the now-current VVC design, two affine modes, including 4-parameter affine mode and 6-parameter affine mode, are supported for one affine coding block.

The 4-parameter affine model has the following parameters: two parameters for translation movement in horizontal and vertical directions respectively, one parameter for zoom motion and one parameter for rotation motion for both directions. Horizontal zoom parameter is equal to vertical zoom parameter. Horizontal rotation parameter is equal to vertical rotation parameter. To achieve a better accommodation of the motion vectors and affine parameter, in the VVC, those affine parameters are translated into two MVs (which are also called control point motion vector (CPMV)) located at the top-left corner and top-right corner of a current block. The affine motion field of the block is described by two control point MVs ($V_0$, $V_1$).

Based on the control point motion, the motion field ($v_x$, $v_y$) of one affine coded block is calculated as described in the box immediately following this paragraph.

Equation 2

$$v_x = \frac{(v_{1x} - v_{0x})}{w}x - \frac{(v_{1y} - v_{0y})}{w}y + v_{0x}$$

$$v_y = \frac{(v_{1y} - v_{0y})}{w}x + \frac{(v_{1x} - v_{0x})}{w}y + v_{0y}$$

The 6-parameter affine mode has following parameters: two parameters for translation movement in horizontal and vertical directions respectively, one parameter for zoom motion and one parameter for rotation motion in horizontal direction, one parameter for zoom motion and one parameter for rotation motion in vertical direction. The 6-parameter affine motion model is coded with three MVs at three CPMVs.

The three control points of one 6-parameter affine block are located at the top-left, top-right and bottom left corner of the block. The motion at top-left control point is related to translation motion, and the motion at top-right control point is related to rotation and zoom motion in horizontal direction, and the motion at bottom-left control point is related to rotation and zoom motion in vertical direction. Compared to the 4-parameter affine motion model, the rotation and zoom motion in horizontal direction of the 6-parameter may not be same as those motion in vertical direction.

Assuming ($V_0$, $V_1$, $V_2$) are the MVs of the top-left, top-right and bottom-left corners of the current block, the motion vector of each sub-block ($v_x$, $v_y$) is derived using three MVs at control points as described in the box immediately following this paragraph.

$$v_x = v_{0x} + (v_{1x} - v_{0x}) * \frac{x}{w} + (v_{2x} - v_{0x}) * \frac{y}{h}$$

$$v_y = v_{0y} + (v_{1y} - v_{0y}) * \frac{x}{w} + (v_{2y} - v_{0y}) * \frac{y}{h}$$

To improve affine motion compensation precision, the Prediction Refinement with Optical Flow (PROF) is currently investigated in the current VVC which refines the sub-block based affine motion compensation based on the optical flow model. Specifically, after performing the sub-block-based affine motion compensation, luma prediction sample of one affine block is modified by one sample refinement value derived based on the optical flow equation. In details, the operations of the PROF can be summarized as the following four steps.

In step one, the sub-block-based affine motion compensation is performed to generate sub-block prediction/(i,j) using the sub-block MVs as derived in Equation 2 above for 4-parameter affine model and in Equation 3 above for 6-parameter affine model.

In step two, the spatial gradients $g_x(i,j)$ and $g_y(i,j)$ of each prediction samples arc calculated as described in the box immediately following this paragraph.

$$g_x(i,j)=(I(i+1,j)-I(i-1,j))>>(\max(2,14\text{-bitdepth})-4)$$

$$g_y(i,j)=(I(i,j+1)-I(i,j-1))>>(\max(2,14\text{-bitdepth})-4)$$

Still in step two, to calculate the gradients, one additional row/column of prediction samples need to be generated on each side of one sub-block. To reduce the memory bandwidth and complexity, the samples on the extended borders are copied from the nearest integer pixel position in the reference picture to avoid additional interpolation processes.

In step three, luma prediction refinement value is calculated as described in the box immediately following this paragraph.

$$\Delta I(i,j)=g_x(i,j)*\Delta v_x(i,j)+g_y(i,j)*\Delta v_y(i,j)$$

where the Av (i,j) is the difference between pixel MV computed for sample location (i,j), noted by v (i,j), and the sub-block MV of the sub-block where the pixel (i,j) locates at.

Additionally, in the current PROF design, after adding the prediction refinement to the original prediction sample, one clipping operation is performed as the fourth step to clip the value of the refined prediction sample to be within 15-bit, as described in the box immediately following this paragraph.

$$I'(i,j)=I(i,j)+\Delta I(i,j)$$

$$I'(i,j)=\text{clip}3(-2^{14},2^{14}-1,I'(i,j))$$

where I (i,j) and IT (i,j) are the original and refined prediction sample at location (i,j), respectively.

Because the affine model parameters and the pixel location relative to the sub-block center are not changed from sub-block to sub-block, $\Delta v(i,j)$ can be calculated for the first sub-block, and reused for other sub-blocks in the same CU. Let $\Delta x$ and $\Delta y$ be the horizontal and vertical offset from the sample location (i,j) to the center of the sub-block that the sample belongs to, $\Delta v(i,j)$ can be derived as described in the box immediately following this paragraph.

$$\Delta v_x(i,j)=c*\Delta x+d*\Delta y$$

$$\Delta v_y(i,j)=e*\Delta x+f*\Delta y$$

Based on the affine sub-block MV derivation equations, Equation 2 and Equation 3 above, the MV difference $\Delta v(i,j)$ can be derived as described in the box immediately following this paragraph.

$$\text{for 4-parameter affine model,} \begin{cases} c = f = \dfrac{v_{1x} - v_{0x}}{w} \\ e = -d = \dfrac{v_{1y} - v_{0y}}{w} \end{cases}$$

$$\text{For 6-parameter affine model,} \begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where ($v_{0x}$, $v_{0y}$), ($v_{1x}$, $v_{1y}$), ($v_{2x}$, $v_{2y}$) are the top–left, top–right and bottom–left control point MVs of the current coding block, w and h are the width and height of the block. In the existing PROF design, the MV difference $\Delta v_x$ and $\Delta v_y$ are always derived at the precision of $1/32-pel$.

According to the now-current LMCS design, the chroma residual samples are scaled based on their corresponding luma prediction samples. When the newer coding tools are enabled for an inter CU, the luma prediction samples used to scale the chroma residual samples through LMCS in this inter CU are obtained at the end of the sequential applications of these newer coding tools.

Figure 6:
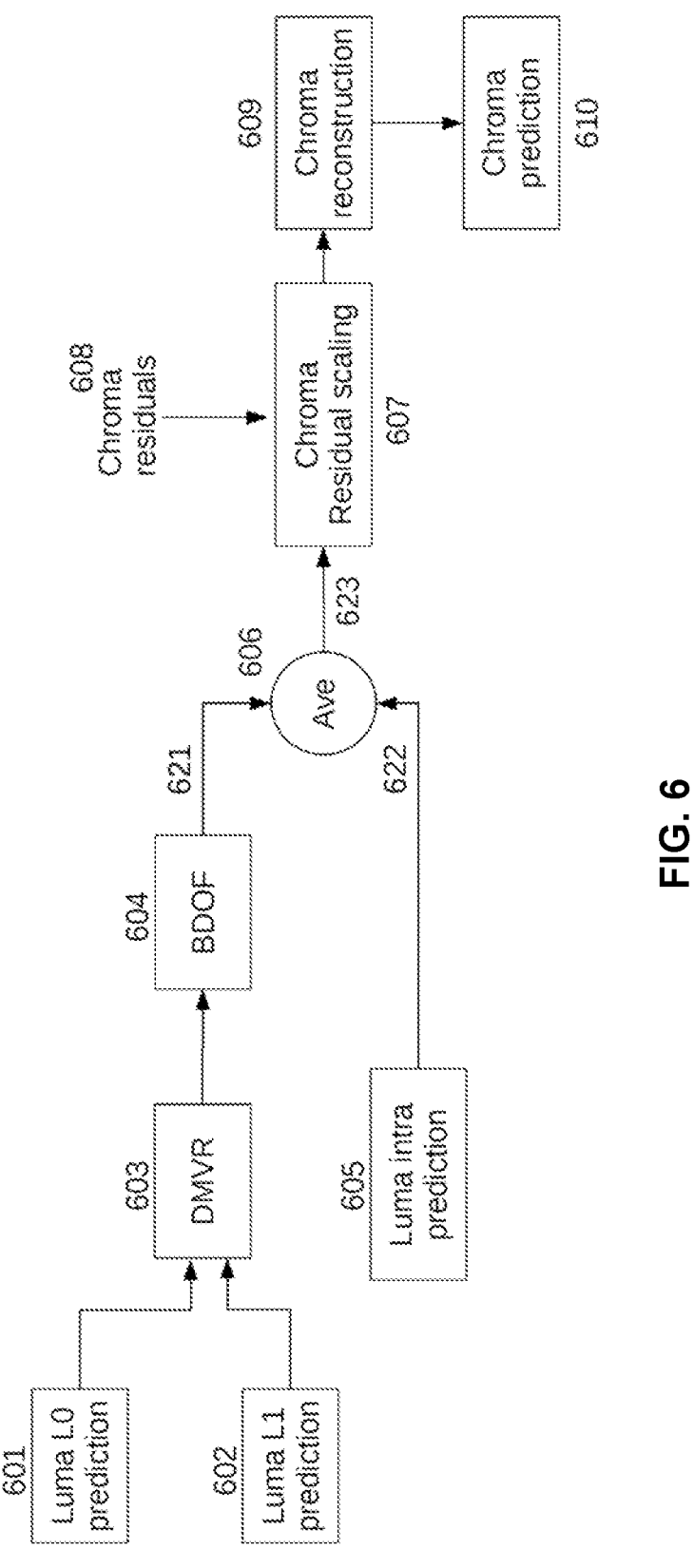
FIG. 6 is a flow chart illustrating the workflow of the chroma residual scaling in LMCS when all of the DMVR, the BDOF and the CIIP are enabled.

FIG. 6 is a flow chart illustrating the workflow of the chroma residual scaling in LMCS when all of the DMVR, the BDOF and the CIIP are enabled. Outputs from Luma L0 prediction value 601 and L1 prediction value 602 are fed into DMVR 603 and BDOF 604 sequentially, and the resulting luma inter prediction value 621 are fed together with the luma intra prediction value 622 from luma intra prediction 605 into average 606 to produce the averaged luma prediction value 623, which is fed together with chroma residuals 608 into chroma residual scaling 607, such that chroma residual scaling 607, chroma prediction 610 and chroma reconstruction 609 can work together to produce the final result.

The now-current LMCS design presents three challenges to the video decoding process. First, the mappings between different domains require extra computation complexity and on-chip memory. Second, the fact that the luma and chroma scaling factor derivations use different luma prediction values introduces extra complexity. Third, the interaction between the LMCS and the newer coding tools introduces latency into the decoding process.

First, in the now-current LMCS design, both the reconstructed samples in the original domain and the mapped domain are used at various decoding modules. As a result, these samples often need to be converted from one domain into another between different decoding modules, which may incur both higher computational complexity and more on-chip memory.

Specifically, for the intra mode, the CIIP mode and the IBC mode, the mapped domain reference samples from the neighboring reconstructed regions of one current CU are used to generate the prediction samples. But for the inter modes, the motion compensated prediction is performed using the original domain reconstructed samples of temporal reference pictures as references. The reconstructed samples stored in the DPB are also in the original domain.

For example, for inter CUs, because the luma reconstruction operation (i.e. adding the prediction samples and the residual samples together) is performed in the mapped domain, the inter prediction luma samples that are generated in the original domain need to be converted into the mapped domain before they are used for luma sample reconstruction. In another example, for both intra and inter CUs, the inverse (or backward) mapping is always applied to convert the reconstructed luma samples from the mapped domain to the original domain before storing them in the DPB. Such a design not only increases computational complexity due to additional forward/inverse mapping operations but also requires more on-chip memory to maintain multiple versions of the reconstructed samples.

In practical hardware implementation, the forward and inverse (or backward) mapping functions FwdMap and InvMap can be implemented either using look-up-table (LUT) or calculated on-the-fly. When the LUT based solution is used, the possible output elements from functions FwdMap, InvMap and cScaleInv can be pre-calculated and pre-stored as a LUT, which can then be used for the luma mapping and chroma residual scaling operations of all the CUs in the current slice. Assuming the input video is 10-bit, there are $2^{10}$=1024 elements in each of the LUTs for FwdMap and InvMap, and each element in the LUTs has 10-bit. Therefore, the total storage for the LUTs of the forward and inverse luma mapping is equal to 2*1024*10=20480 bits=2560 bytes. On the other hand, to derive the chroma scaling parameters $C_{scaleInv}$, one 16-entry LUT table cScaleInv needs to be maintained at encoder and decoder and each chroma scaling parameter is stored in 32-bit. Correspondingly, the memory size that is used to store the LUT cScaleInv is equal to 16*32=512 bits=64 bytes. The difference between 2560 and 64 shows the scale of the extra on-chip memory required by the forward and inverse (backward) mapping operations.

Moreover, in newer video coding standards such as the now-current VVC, both the intra prediction and the deblocking filter use the reconstructed samples of above neighboring block. Therefore, one extra row of reconstructed samples in the width of the current picture/slice may need to be maintained in a buffer, which is also known as "line-buffer" in video coding. Reconstructed samples in the line-buffer are at least used as references for the intra prediction and the deblocking operations of the CUs located in the first row inside one CTU. According to the existing LMCS design, the intra prediction and the deblocking filter use the reconstructed samples in different domains. Therefore, additional on-chip memory become necessary to store both the original and the mapped domain reconstructed samples, which could approximately double the line-buffer size.

One implementation choice to avoid the doubling of line-buffer size is to perform the domain mapping operation on-the-fly. However, this comes at the expense of non-negligible computational complexity increase.

Therefore, the now-current design of the LMCS, because of the required mappings between different domains, will require extra computation complexity and on-chip memory.

Secondly, although both luma and chroma scaling factor derivation methods in the now-current design of the LMCS use the luma prediction sample values to derive the corresponding scaling factors, there are differences between their corresponding operations.

For luma residual scaling, the scaling factors are derived per sample by allowing each luma residual sample to have its own scaling factor. However, for chroma residual scaling, the scaling factor is fixed for the whole CU, i.e., all the chroma residual samples within the CU share the same scaling factor that is calculated based on the average of the mapped luma prediction samples.

Also, two different LUTs are used to calculate the scaling factors of luma and chroma residuals. Specifically, the input to the luma LUT is the mapping model segment index of the original luma prediction sample value, while the input to the chroma LUT is the mapping model segment index of the average value of mapped luma prediction samples.

Such differences introduce extra complexity into the coding process, and a harmonized approach to luma and chroma scaling factor derivation is desirable.

Thirdly, for the chroma residual scaling of the now-current design of the LMCS, newer coding tools, such as all the three modules of DMVR, BDOF and CIIP, can be invoked sequentially to generate the luma prediction samples that are then used to determine the scaling factor of the chroma residual. Given the high computational complexity of the three modules, to wait until their success completion before carrying out the chroma residual scaling of the LMCS could cause severe latency for the decoding of the chroma samples. For an affine CU, the PROF process may also have latency issue, as each affine CU may perform PROF process followed by the LMCS, which could also cause latency issue foe the decoding of the chroma samples.

Moreover, in the now-current design of the LMCS, un unnecessary clipping operation is performed during the chroma residual scaling factor derivation process, further increasing the extra requirement of computation complexity and on-chip memory.

The present disclosure aims at resolving or mitigating these challenges presented by the now-current design of the LMCS, more specifically, the present disclosure discusses schemes that may reduce the complexity of the LMCS for hardware codec implementation while maintaining the coding gain.

Instead of using the existing LMCS framework that converts the prediction/reconstruction samples through mapping operations, one new method, which is called prediction dependent residual scaling (PDRS), is proposed to scale the prediction residuals directly without sample mapping. The proposed method can achieve similar effect and coding efficiency as LMCS, but with a much lower implementation complexity.

Figure 7:
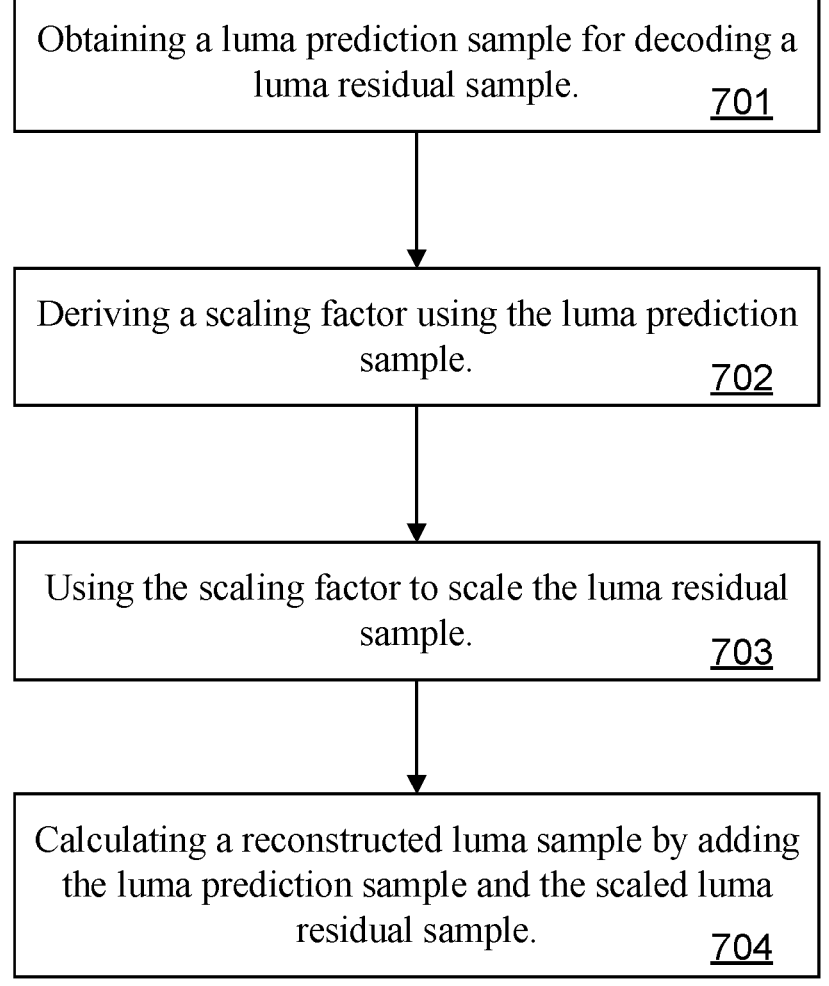
FIG. 7 is a flow chart illustrating the steps of the prediction dependent residual scaling (PDRS) procedure.

In the PDRS procedure, as illustrated in FIG. 7, a luma prediction sample is obtained for decoding a luma residual sample (701), a scaling factor is derived using the luma prediction sample (702), the scaling factor is used to scale the luma residual sample (703), and a reconstructed luma sample is calculated by adding the luma prediction sample and the scaled luma residual sample (704).

Unlike the existing LMCS method that directly converts the predicted/reconstructed luma samples into the mapped domain before calculating luma prediction residual, in the proposed method of the PDRS procedure, the luma prediction residual samples are derived in the same way as that in the regular prediction process in the original domain without any mapping operations, followed by a scaling operation on the luma prediction residual. The scaling of luma prediction residual is dependent on the corresponding luma prediction sample value and a piece-wise linear model. As a result, the forward and inverse luma mapping operations in the current LMCS design can be completely discarded, with all the prediction and reconstruction samples involved during the decoding process maintained in the original sample domain. Based on the above features, the proposed method is named Prediction Dependent Residual Scaling.

Figure 8:
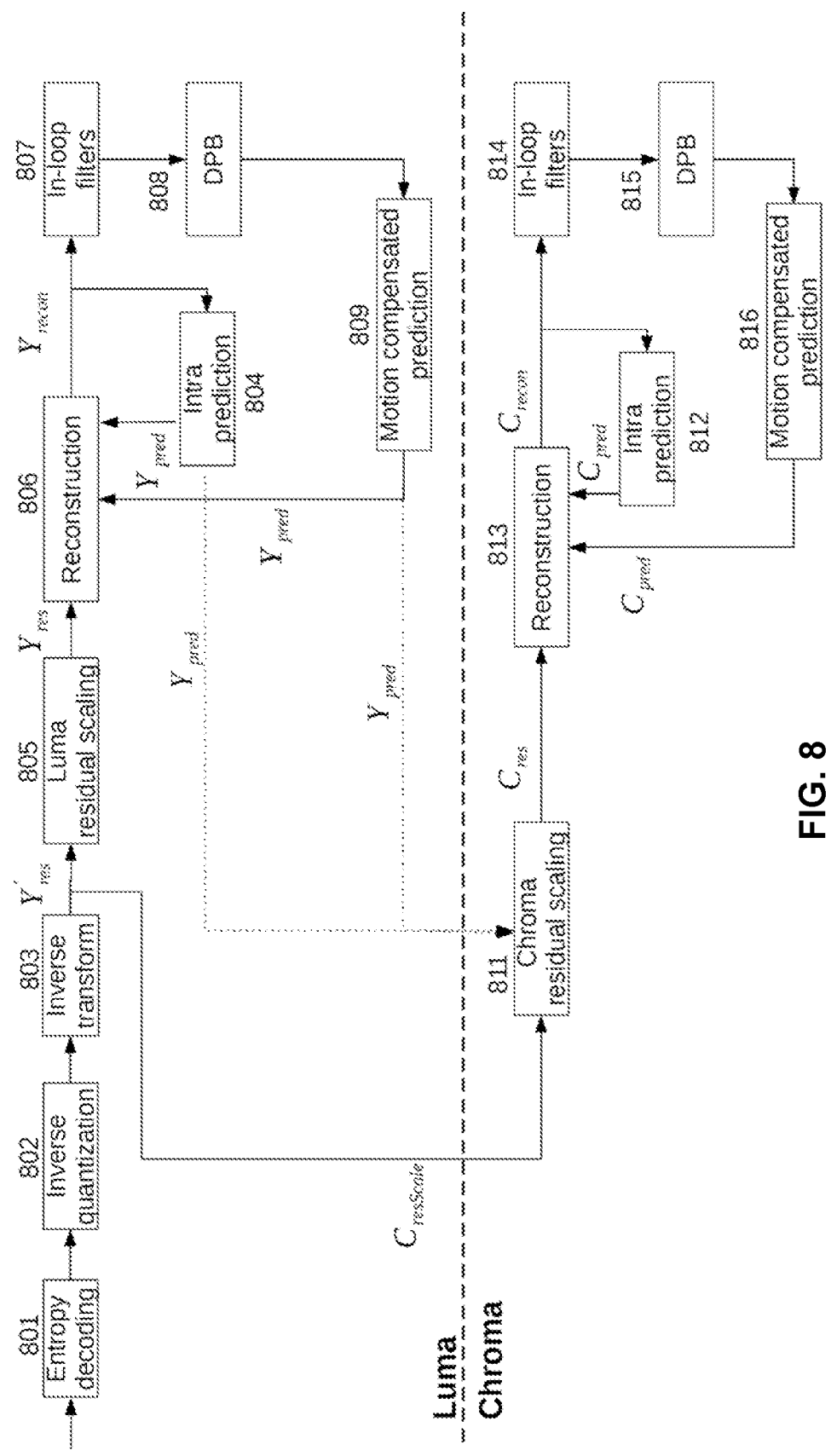
FIG. 8 is a flow chart illustrating the workflow of the decoding process when the PDRS procedure is applied in the LMCS process.

FIG. 8 is a flow chart illustrating the workflow of the decoding process when the PDRS procedure is applied in the LMCS process. It illustrates the removal of the need of mapping between different domains. Now, except for the residual decoding modules (e.g., entropy decoding 801, inverse quantization 802 and the inverse transform 803), all the other decoding modules (including intra and inter prediction 804, 809, 812 and 816, reconstruction 806 and 813, and all in-loop filters 807 and 814) are operating in the original domain. Specifically, to reconstruct the luma samples, the proposed method in the PDRS procedure only needs to de-scale the luma prediction residual samples $Y_{res}$ back to their original amplitude levels, then add them onto the luma prediction samples $Y_{pred}$.

With the PDRS procedure, the forward and inverse luma sample mapping operations in the existing LMCS design are completely removed. This not only saves/reduces computational complexity but also reduces the size of potential storage for saving LMCS parameters. For instance, when the LUT-based solution is used to implement the luma mapping, the storage that is previously used to store the two mapping LUTs FwdMap[ ] and InvMap[ ] (around 2560 Bytes) are not needed anymore in the proposed method. Furthermore, unlike the existing luma mapping method that needs to store the reconstruction luma samples in both the original and mapped domains, the proposed method in the PDRS procedure generates and maintains all the prediction and reconstruction samples only in the original domain. Correspondingly, compared to the existing luma mapping, the proposed method in the PDRS procedure can efficiently reduce the line-buffer size used to store the reconstructed samples for the intra prediction and the deblocking by half.

According to one or more embodiments of the PDRS procedure, the luma prediction sample and the luma residual sample are from one same collocated position in luma prediction block and its associated residual block.

According to one or more embodiments of the PDRS procedure, deriving the scaling factor using the luma prediction sample comprises dividing the full range of possible luma prediction sample values into a plurality of luma prediction sample segments, calculating one scaling factor for each of the plurality of the luma prediction sample segments based on a pre-defined piece linear model, and determining the scaling factor of the luma prediction sample based on the scaling factors of the plurality of luma prediction sample segments.

In one example, determining the scaling factor of the luma prediction sample based on the scaling factors of the plurality of luma prediction sample segments comprises allocating the luma prediction sample into one segment among the plurality of luma prediction sample segments and calculating the scaling factor of the luma prediction sample as the scaling factor of the allocated luma prediction sample segment.

In this example, the plurality of luma prediction sample segments comprises 16 segments in a pre-defined 16-piece LUT table scaleForward, and the pre-defined piece linear model for calculating one scaling factor for each of the plurality of the luma prediction sample segments comprises the 16 values corresponding to the 16 segments in the pre-defined LUT table scaleForward.

In the same example, the scaling factor is calculated based on the allocated luma prediction sample segment as described in the box immediately following this paragraph.

$Scale_Y$ = scaleForward[$Idx_Y$]
where Y is the luma residual value for which the scaling factor is being calculated, $Scale_Y$ is the scaling factor, scaleForward[i], i = 0 ... 15, is the pre-defined 16-piece LUT table, and $Idx_Y$ is the segment index of the allocated segment for the luma prediction sample domain value.
scaleForward[i], i = 0 ... 15 are pre-calculated as:
scaleForward[i] = (OrgCW << SCALE_FP_PREC)/SignaledCW[ i ]
where OrgCW and SignaledCW[i] are the number of codewords of the i-th segment in the original domain and the mapped domain, and SCALE_FP_PREC is the precision of scaling factor.

In the same example, given the luma scaling factor Scaley, the luma residual sample scaling method can be applied as described in the box immediately following this paragraph.

The motivation behind this example is that, the forward mapping in the now-current LMCS is based on one piece-wise linear model. If both the original luma sample and the luma prediction sample are located at the same piece (i.e., the same segment defined by two pivot points InputPivot[i] and InputPivot[i+1]), the two forward mapping functions of the original and prediction luma samples become exactly the same. Correspondingly, it leads to Y'res=FwdMap(Yorg)−FwdMap(Ypred)=FwdMap(Yorg−Ypred)=FwdMap(Yres). By applying the inverse mapping on both sides of this equation, a corresponding decoder side reconstruction operation can be expressed as: Yrecon=Ypred+InvMap(Y'res).

In other words, in the situation where both the original luma sample and the luma prediction sample are located at the same piece, the luma mapping method in LMCS can be At encoder side: $Y'_{res} = (Y_{Res} << \text{SCALE\_FP\_PREC})/\text{Scale}_Y$
At decoder side: $Y_{Res} = (Y_{res}{}' * \text{Scale}_Y) >> \text{SCALE\_FP\_PREC}$ achieved through one residual scaling operation in the decoding process, as implemented in this possible implementation.

Although such a conclusion is derived based on the assumption that both the original luma sample and the luma prediction sample are located in the same segment defined by two pivot points InputPivot[i] and InputPivot[i+1], this possible implementation of this example can still in any case be used as a simplification and/or approximation for the existing luma mapping operation in VVC even when the original luma sample and the luma prediction sample are located in different segments of the piece-wise linear model. Experiment results show that the such a simplification and/or approximation incurs little coding performance impact.

To reiterate, this example is based on the assumption that both the original and predicted luma sample values locate in the same segment of the piece-wise linear mode. In this case, the forward/inverse mapping functions that are applied to the original and predicted luma samples are the same; therefore, it is safe to calculate the corresponding residual scaling factor merely depending on the luma prediction sample.

However, when the predicted samples of the CU are not accurate enough (e.g., for intra-predicted CUs where the samples being far away from the reference samples are usually predicted less accurately), the prediction sample and the original sample are often located in different segments of the piece-wise linear model. In this case, the scaling factor derived based on the prediction sample value can be unreliable in reflecting the original mapping relationship between the residual samples in the original (i.e., non-mapped) domain and the residual samples in the mapped domain.

Figure 9:
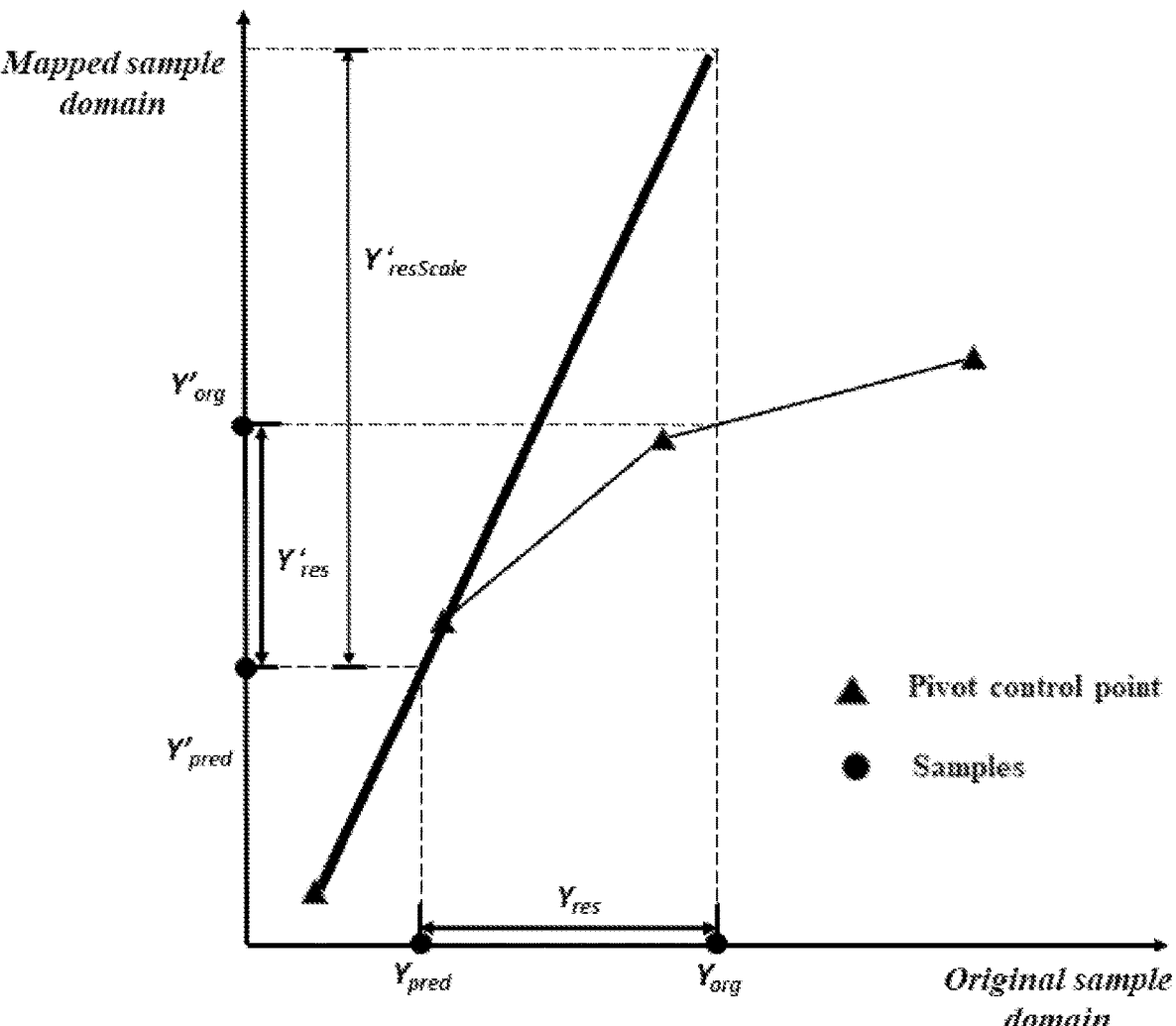
FIG. 9 is an illustration of the residual mapping error caused by merely using the prediction sample to derive the scaling factor.

FIG. 9 is an illustration of the residual mapping error caused by merely using the prediction sample to derive the scaling factor. In FIG. 9, the triangle-shaped solid dots represent the pivot control points of different segments in the piece-wise linear function and the circular-shaped solid dots represent the original and predicted sample values; $Y_{org}$ and $Y_{pred}$ are the original and predicted samples in the original (i.e., non-mapped) domain; $Y'_{org}$ and $Y'_{pred}$ are the mapped samples of $Y_{org}$ and $Y_{pred}$ respectively. $Y_{res}$ and $Y'_{res}$ are the corresponding residuals in the original domain and the mapped domain when the existing sample-based luma mapping method in VVC is applied; $Y'_{resScale}$ is the mapped residual sample which is derived based on the proposed luma residual scaling scheme. As shown in FIG. 9, because the original sample and the prediction sample are not in the same segment of the piecewise linear model, the scaling factor derived based on the prediction sample may not be accurate enough to produce a scaled residual (i.e., $Y'_{resScale}$) that approximates the original residual in the mapped domain (i.e., $Y'_{res}$).

In a second example, the assumption that both the original and predicted luma sample values locate in the same segment of the piece-wise linear mode is not required.

In this second example, instead of deriving the scaling factor directly from the segment of the piece-wise linear model where the luma prediction sample is located, the scaling factor is calculated as the average of the scaling factors of N (N is a positive integer number) neighboring segments.

In this second example, determining the scaling factor of the luma prediction sample based on the scaling factors of the plurality of luma prediction sample segments comprises allocating the luma prediction sample into one segment among the plurality of luma prediction sample segments and calculating the scaling factor of the luma prediction sample as the average of the scaling factors of a number of luma prediction sample segments that are neighboring to the allocated luma prediction sample segment.

More specifically, in one possible implementation of this second example, the scaling factor may be calculated based on the allocated luma prediction sample segment as described in the following steps.

1) Finding or obtaining the corresponding segment index $\text{Idx}_Y$ of the piece-wise linear model which the $\text{Pred}_Y$ belongs to in the original domain.

2) If $$Y'_{res} \geq 0,$$

the luma residual scaling factor is calculated as:

$$\text{Scale}_Y = \frac{1}{N} \sum_{i=\text{Idx}_Y}^{\text{Idx}_Y+N-1} \text{scaleForward}[i]$$

3) Otherwise $$(\text{i.e., } Y'_{res} < 0),$$

the luma residual scaling factor is calculated as:

$$\text{Scale}_Y = \frac{1}{N} \sum_{k=\text{Idx}_Y-N+1}^{\text{Idx}_Y} \text{scaleForward}[i].$$

where scaleForward[i], i=0 . . . 15, is the pre-defined 16-piece LUT, which is calculated as:

$$\text{scaleForward}[i] = (\text{OrgCW} << \text{SCALE\_FP\_PREC})/\text{Signaled}CW[i]$$

where OrgCW and SignaledCW[i] are the number of codewords of the i-th segment in the original domain and the mapped domain respectively, and SCALE_FP_PREC is the precision of scaling factor.

In a second possible implementation of this second example that is otherwise identical to the implementation described above, the scaling factor may be calculated based on allocated luma prediction sample segment as described in the box immediately following this paragraph:

1) Finding or obtaining the corresponding segment index $Idx_Y$ of the piece–wise linear model which the $Pred_Y$ belongs to in the original domain.

2) The luma residual scaling factor is calculated as:

$$Scale_Y = \frac{1}{N} \sum_{i=Idx_{Y}-M}^{Idx_Y+N-1-M} scaleForward[i]$$

Where scaleForward remains the same as in the previous example, and $M$ is an integer number in the range of [0, (N − 1)].

One exemplar value of $M$ is (N − 1)/2.

Another exemplar value of $M$ may be N/2.

The above two possible implementations of this second example only differ in the selection of the N luma prediction sample domain value segments based on the allocated segment.

In one chroma sample reconstruction procedure, as illustrated in FIG. 10, a luma prediction sample value is obtained for decoding both a luma residual sample and a chroma residual sample at an input position (1001), a luma prediction sample associated with the luma residual sample is then obtained (1002), a chroma prediction sample associated with the chroma residual sample is then obtained (1003), the luma prediction sample is used to derive a first scaling factor for the luma residual sample and a second scaling factor for the chroma residual sample (1004), the first scaling factor is used to scale the luma residual sample (1005), the second scaling factor is used to scale the chroma residual sample (1006), a reconstructed luma sample is calculated by adding the luma prediction sample and the scaled luma residual sample (1007), and a reconstructed chroma sample is calculated by adding the chroma prediction sample and the scaled chroma residual sample (1008).

The chroma sample reconstruction procedure aims at harmonizing the scaling methods of luma and chroma residuals so as to achieve a more unified design.

According to one or more embodiments of the chroma sample reconstruction procedure, the luma prediction sample value is an average of all luma prediction samples in a coding unit (CU) containing the input position. In these embodiments, the chroma scaling derivation method is used to calculate the scaling factor for luma residuals, more specifically, instead of separately deriving one scaling factor for each luma residual sample, one shared scaling factor which is calculated based on the average of luma prediction samples is used to scale the luma residual samples of the whole CU.

According to another embodiment of the chroma sample reconstruction procedure, the luma prediction sample value is an average of all luma prediction samples in a pre-defined subblock sub-divided from a coding unit (CU) containing the input position. In this embodiment, one CU is firstly equally partitioned into multiple M×N subblocks; then for each subblock, all or partial luma prediction samples are used to derive a corresponding scaling factor that is used to scale both the luma and chroma residuals of the subblock. Compared to the first method, the second method can improve the spatial precision of the estimated scaling factor because the less correlated luma prediction samples that are outside a subblock are excluded from calculating the scaling factor of the subblock. Meanwhile, the second method can also reduce the latency of luma and chroma residual reconstruction, given that the scaling of luma and chroma residuals in one subblock can be immediately started after the luma prediction of the subblock is finished, i.e., without waiting for the full generation of the luma prediction samples of the whole CU.

According to a third embodiment of the chroma sample reconstruction procedure, the luma prediction sample domain value comprises a collocated luma prediction sample. In this embodiment, the luma residual scaling method is extended to scaling the chroma residuals, and different scaling factors for each chroma residual sample are derived based on its collocated luma prediction sample value.

In the above embodiments of the chroma sample reconstruction procedure, it is proposed to use the same LUT that is used for calculating the luma scaling factor to do the scaling of chroma residuals. In one example, to derive a CU-level scaling factor ScaleC for chroma residual, the following may be followed:
1) Calculating the average of the luma prediction samples (which are represented in the original domain) within the CU, denoted as $avg_Y$.
2) Finding or obtaining the corresponding segment index $Idx_Y$ of the piece-wise linear model which the $avg_Y$ belongs to.
3) Calculating the value of $Scale_C$ as:

$Scale_C$=scaleForward[$Idx_Y$]

where scaleForward [i], i=0 . . . 15, is one pre-defined 16-piece LUT, which is calculated as:

scaleForward[$i$]=(Org$CW$<<SCALE_$FP$_PREC)/ Signaled$CW$[$i$]

where OrgCW and SignaledCW [i] are the number of codewords of the i-th segment in the original domain and the mapped domain respectively, and SCALE_FP_PREC is the precision of scaling factor.

The example above can be easily extended to the case where a scaling factor for chroma residual is derived per each subblock of a current CU. In that case, in the first step above avgY would be calculated as the average of the luma prediction samples in the original domain of a subblock, while step 2 and step 3 remain the same.

In a second chroma sample reconstruction procedure, as illustrated in FIG. 11, a plurality of luma prediction samples is obtained by skipping a number of a pre-defined intermediate luma prediction stages during a luma prediction process for a coding unit (CU) (1101), the obtained plurality of luma prediction samples is used to derive scaling factors for chroma residual samples in the CU (1102), the scaling factors are used to scale the chroma residual samples in the CU (1103), and a reconstructed chroma sample is calculated by adding the chroma prediction samples and the scaled chroma residual samples in the CU (1104).

According to one or more embodiments of the second chroma sample reconstruction procedure, the pre-defined intermediate luma prediction stages contain one or more bi-prediction modules of Decoder-side Motion Vector Derivation (DMVR), Bi-Directional Optical Flow (BDOF) and Combined Inter and Intra Prediction (CIIP). In these embodiments, the inter prediction samples derived before the DMVR, the BDOF/PROF, the CIIP intra/inter combination process are used to derive the scaling factor for the chroma residuals.

Figure 12:
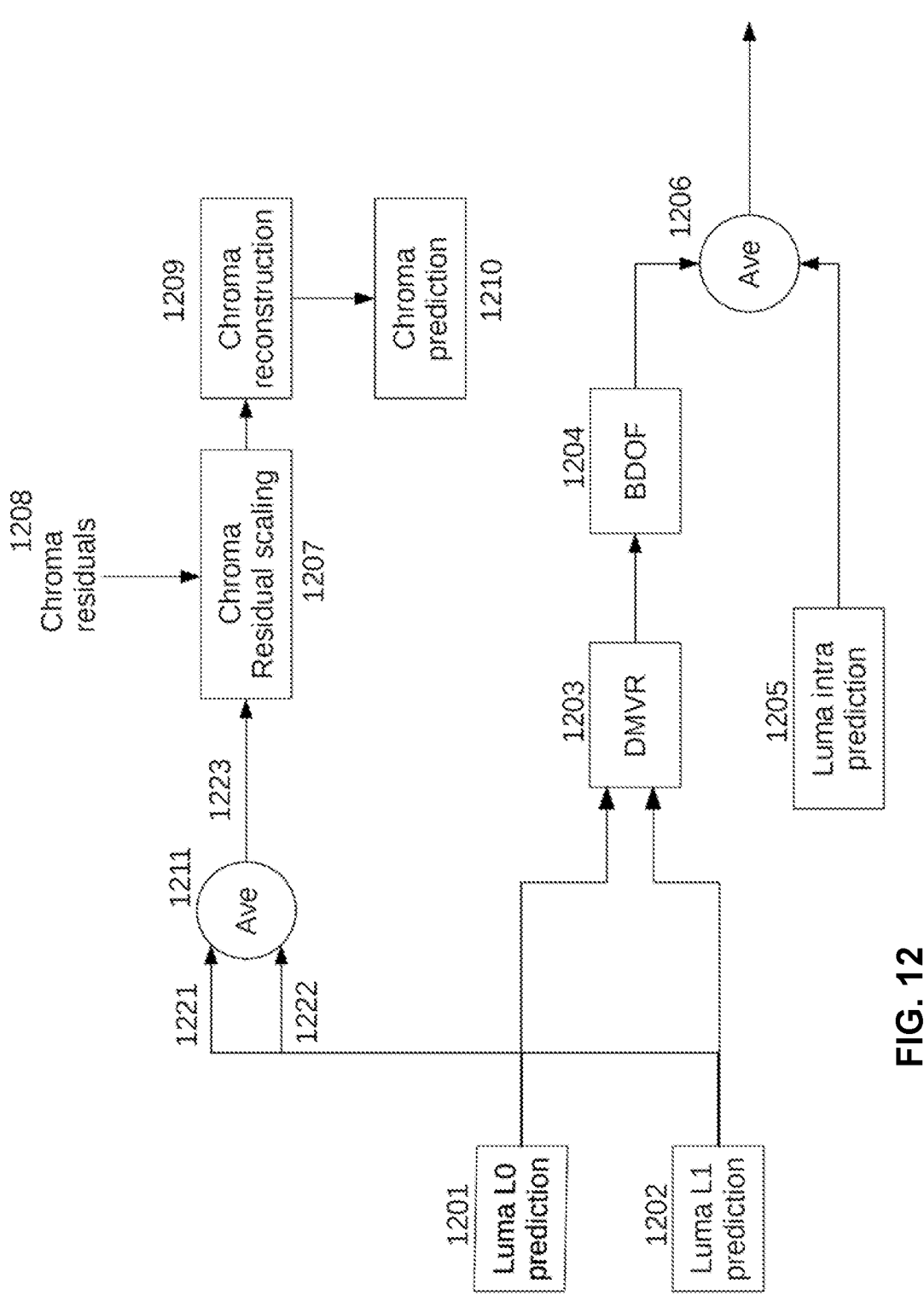
FIG. 12 is a flow chart illustrating the workflow of the LMCS decoding process in one example of the second chroma sample reconstruction procedure where the DMVR, the BDOF and the CIIP are not applied to generate the luma prediction samples for the chroma scaling.

FIG. 12 is a flow chart illustrating the workflow of the LMCS decoding process in one example of this embodiment of the second chroma sample reconstruction procedure where the DMVR, the BDOF and the CIIP are not applied to generate the luma prediction samples for the chroma scaling. Here, instead of waiting for the DMVR 1203, the BDOF 1204 and/or the CIIP's luma intra prediction part 1205 to be fully finished, the chroma residual scaling process 1208 can be started as soon as the prediction samples 1221 and 1222 based on the initial L0 and L1 luma prediction 1201 and 1202 become available.

In FIG. 12, one additional averaging operation 1211 in addition to the original averaging operation 1206 is needed to combine the initial L0 and L1 prediction samples 1221 and 1222 prior to DMVR 1203, BDOF 1204, and/or CIIP 1205.

To reduce the complexity, in a second example of this embodiment of the second chroma sample reconstruction procedure, the initial L0 prediction samples may be used to derive the scaling factor for chroma residuals.

Figure 13:
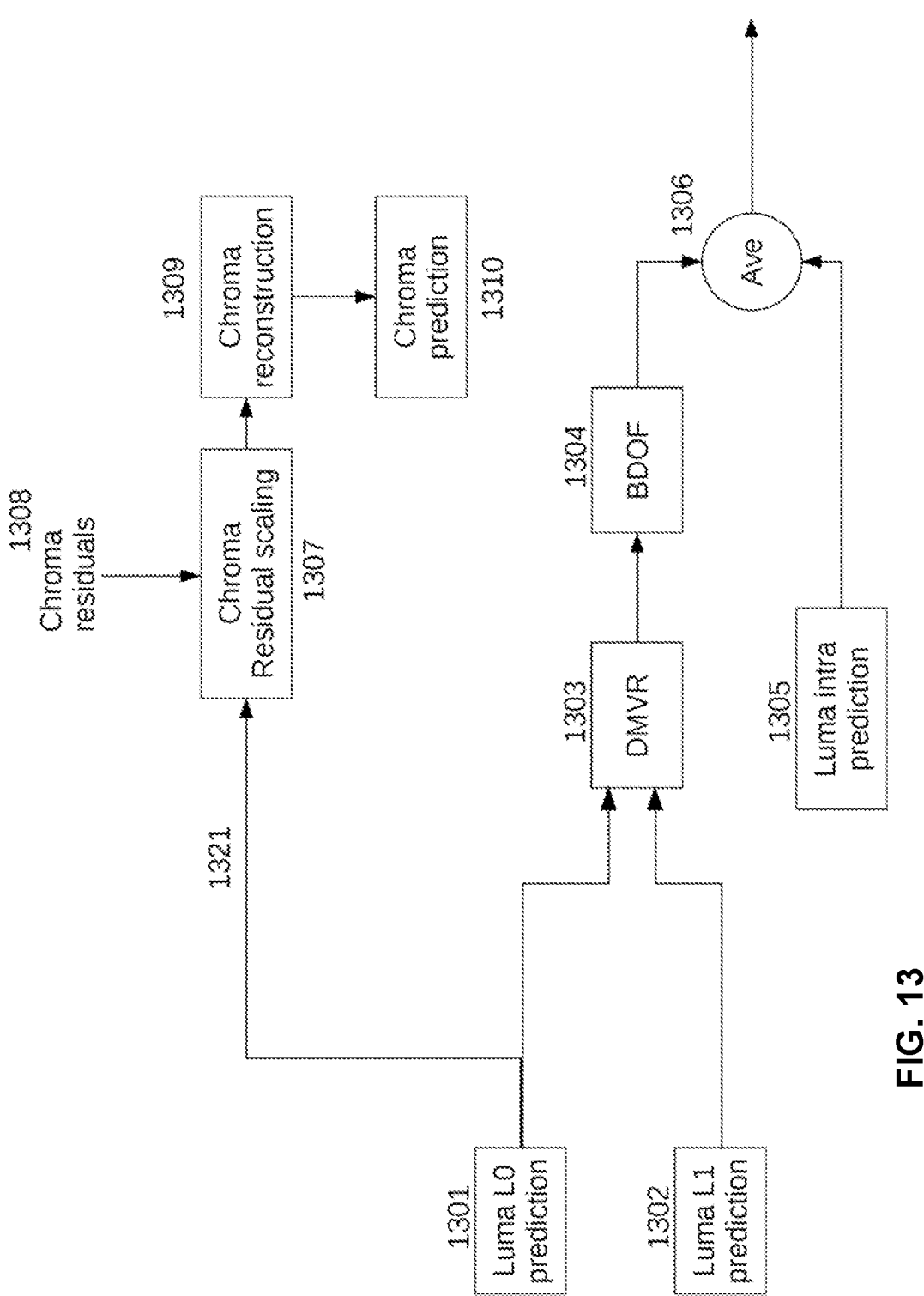
FIG. 13 is a flow chart illustrating the workflow of the LMCS decoding process in a second example of the second chroma sample reconstruction procedure where the initial uni-prediction signal is applied to generate the luma prediction samples for the chroma scaling.

FIG. 13 is a flow chart illustrating the workflow of the LMCS decoding process in the second example of this embodiment of the second chroma sample reconstruction procedure where the initial uni-prediction signal is applied to generate the luma prediction samples for the chroma scaling. No additional averaging operation in addition to the original averaging operation 1306 is needed. The initial L0 prediction samples 1321 are used to derive the scaling factor for chroma residuals prior to DMVR 1303, BDOF 1304, and/or CIIP 1305.

In a third example of this embodiment of the second chroma sample reconstruction procedure, one initial prediction signal (L0 or L1) is chosen in an adaptive manner as the luma prediction samples that are used for deriving the chroma residual scaling factor. In one possible implementation of this example, between the initial prediction signal (L0 or L1), the one whose reference picture has a smaller picture order count (POC) distance relative to the current picture is selected for deriving the chroma residual scaling factor.

In another embodiment of the second chroma sample reconstruction procedure, it is proposed to only disable the DMVR, the BDOF/PROF while enabling the CIIP for generating the inter prediction samples that are used for determining chroma residual scaling factor. Specifically, in this method, the inter prediction samples derived before the DMVR and the BDOF/PROF are firstly averaged which are then combined with the intra prediction samples for the CIIP; finally, the combined prediction samples are used as the prediction samples for deciding the chroma residual scaling factor.

In yet another embodiment of the second chroma sample reconstruction procedure, it is proposed to only disable the BDOF/PROF while keeping the DMVR and the CIIP for generating the prediction samples that are used for determining chroma residual scaling factor.

In still another embodiment of the second chroma sample reconstruction procedure, it is proposed to keep the BDOF/PROF and the CIIP while disabling the DMVR in deriving the luma prediction samples that are used for determining chroma residual scaling factor.

Moreover, it is worth mentioning that although the methods in the embodiments above of the second chroma sample reconstruction procedure are illustrated as they are designed for reducing the latency of chroma prediction residual scaling, those methods can also be used for reducing the latency of luma prediction residual scaling. For example, all those methods can also be applied to the PDRS method explained in the section "luma mapping based on prediction-dependent residual scaling".

According to the existing DMVR design, in order to save computational complexity, the prediction samples used for the DMVR motion refinement are generated using 2-tap bilinear filters instead of default 8-tap interpolation. After the refined motion are determined, the default 8-tap filters will be applied to generate the final prediction samples of the current CU. Therefore, to reduce the chroma residual decoding latency caused by the DMVR, it is proposed to use the luma prediction samples (the average of L0 and L1 prediction samples if the current CU is bi-predicted) that are generated by the bilinear filters to determine the scaling factor of chroma residuals.

According to one chroma residual sample reconstruction procedure, as illustrated in FIG. 14, one or more luma prediction sample values are selected from an output of a bilinear filter of Decoder-side Motion Vector Derivation (DMVR) (1401), the one or more selected luma prediction sample values are adjusted into another or more luma prediction sample values with the same bit depth as an original coding bit depth of an input video (1402), the luma prediction sample values with the same bit depth as the original coding bit depth of the input video are used to derive a scaling factor for decoding one or more chroma residual samples (1403), the scaling factor is used to scale one or more chroma residual samples (1404), and one or more chroma residual samples are reconstructed by adding the one or more scaled chroma residual samples and their corresponding chroma prediction samples (1405).

In one or more embodiments of the chroma residual sample reconstruction procedure, selecting the one or more luma prediction sample values from the output of the bilinear filter of DMVR comprises selecting L0 and L1 luma prediction samples from the output of the bilinear filter of DMVR.

Figure 15:
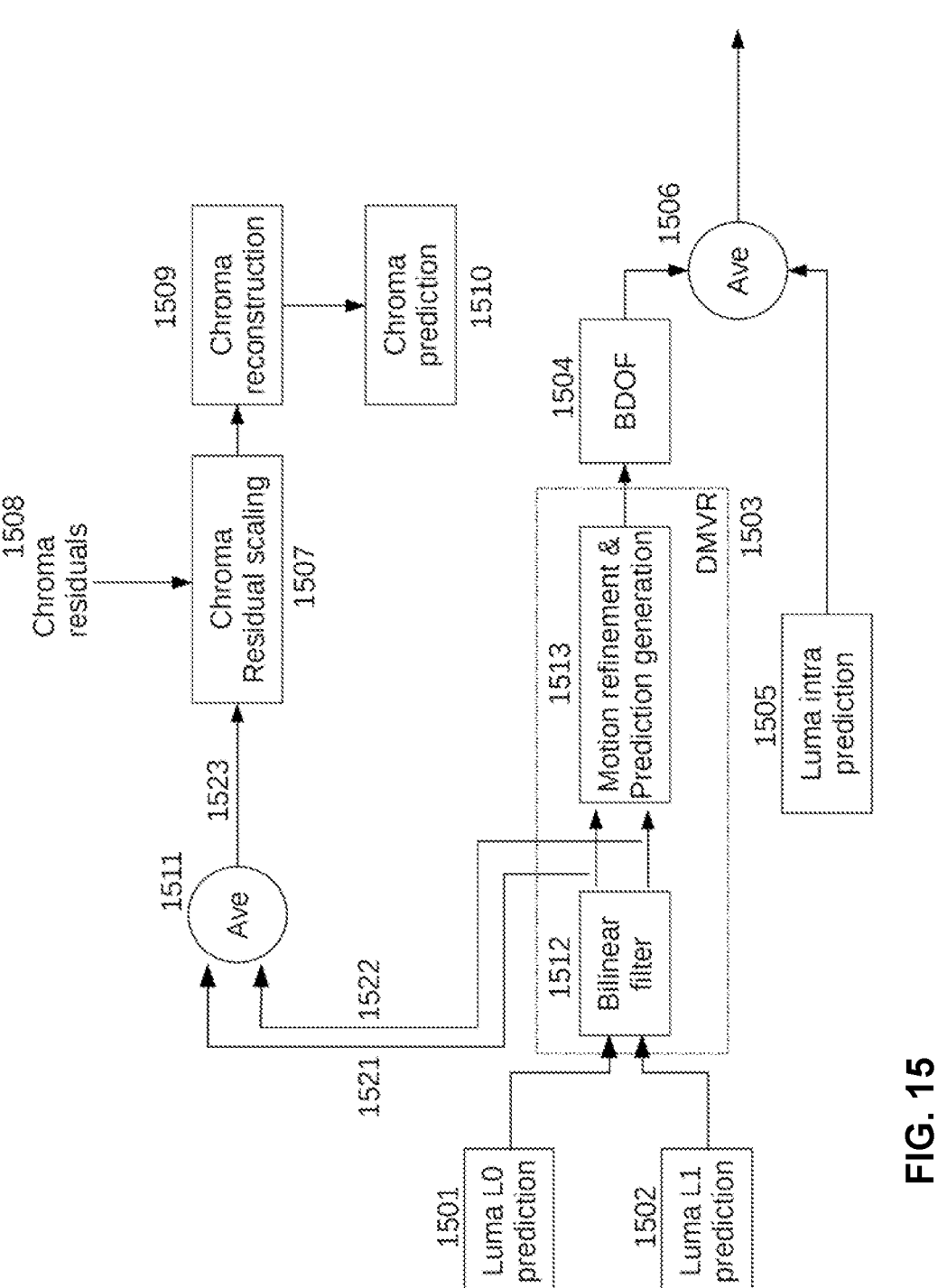
FIG. 15 is a flow chart illustrating the workflow of the LMCS decoding process in one or more embodiments of the chroma residual sample reconstruction procedure.

FIG. 15 is a flow chart illustrating the workflow of the LMCS decoding process in one such embodiment of the chroma residual sample reconstruction procedure. L0 and L1 prediction samples 1521 and 1522 from the output of bilinear filter 1512 component of DMVR 1503 are fed into average 1511 in order to derive a chroma residual scaling input 1523 to be used in chroma residual scaling 1507 for decoding one or more chroma residual samples.

In these embodiments, there is an issue of bit code depth. In order to save the internal storage size used by the DMVR, the intermediate L0 and L1 prediction samples generated by the bilinear filters of the DMVR are in 10-bit precision. This is different from the representation bit-depth of the immediate prediction samples of regular bi-prediction, which is equal to 14-bit. Therefore, the intermediate prediction samples output from the bilinear filters cannot be directly applied to determine the chroma residual scaling factor due to its different precision.

To deal with this issue, it is proposed to firstly align the DMVR intermediate bit-depth with the intermediate bi-depth used for regular motion compensated interpolation, i.e., increase the bit-depth from 10-bit to 14-bit. After that, the existing average process that is applied to generate regular bi-prediction signal can be reused to generate the corresponding prediction samples for the determination of chroma residual scaling factor.

In one example of these embodiments, adjusting the one or more selected luma prediction sample values into the another or more luma prediction sample values with the same bit depth as the original coding bit depth of the input video comprises increasing an internal bit depth of the L0 and L1 luma prediction samples from the output of the bilinear filter of DMVR to 14-bit through left shifting, obtaining a 14-bit average luma prediction sample value by averaging the 14-bit shifted L0 and L1 luma prediction sample values, and converting the 14-bit average luma prediction sample values by changing the internal bit depth of the 14-bit average luma prediction sample values to the original coding bit depth of the input video through right shifting.

More specifically, in this example, the chroma scaling factor is determined by the steps described in the box immediately following this paragraph.

---

1) Internal bit-depth alignment: increase the internal bit-depth of the L0 and L1 prediction samples generated by the bilinear filters from 10-bit to 14-bit, as illustrated as $$P_0^{scale}(i,j) = (P_0(i,j) << 4) - 2^{13}$$
$$P_1^{scale}(i,j) = (P_1(i,j) << 4) - 2^{13}$$

where $P_0(i,j)$ and $P_1(i,j)$ are the prediction samples output from the bilinear filters and $P_0^{scale}(i,j)$ and $P_1^{scale}(i,j)$ are the scaled prediction samples after bit-depth alignment; $2^{13}$ is the constant number that is used to compensate the shifted dynamic range of prediction samples that is caused by the following average operation.

2) Average of L0 and L1 scaled prediction samples: the final luma samples that are used to determine the chroma residual scaling factor are calculated by averaging the two scaled luma prediction samples as $$P_{ave}(i,j) = ((P_0^{scale}(i,j) + P_1^{scale}(i,j)) + 2 \cdot 2^{13} + 2^{14-bitdepth})$$
$$>> (14 - bitdepth + 1)$$

where bitdepth is the coding bit-depth of the input video.

---

In other embodiments of the chroma residual sample reconstruction procedure, selecting the one or more luma prediction sample values from the output of the bilinear filter of DMVR and adjusting the one or more selected luma prediction sample values into the another or more luma prediction sample values with the same bit depth as the original coding bit depth of the input video comprise selecting one luma predication sample out of L0 and L1 luma prediction samples from the output of the bilinear filter of DMVR, adjusting the one selected luma prediction sample by changing an internal bit depth of the one selected luma prediction value to the original coding bit depth of the input video through shifting, and using the adjusted luma prediction sample as the luma prediction sample with the same bit depth as the original coding bit depth of the input video.

Figure 16:
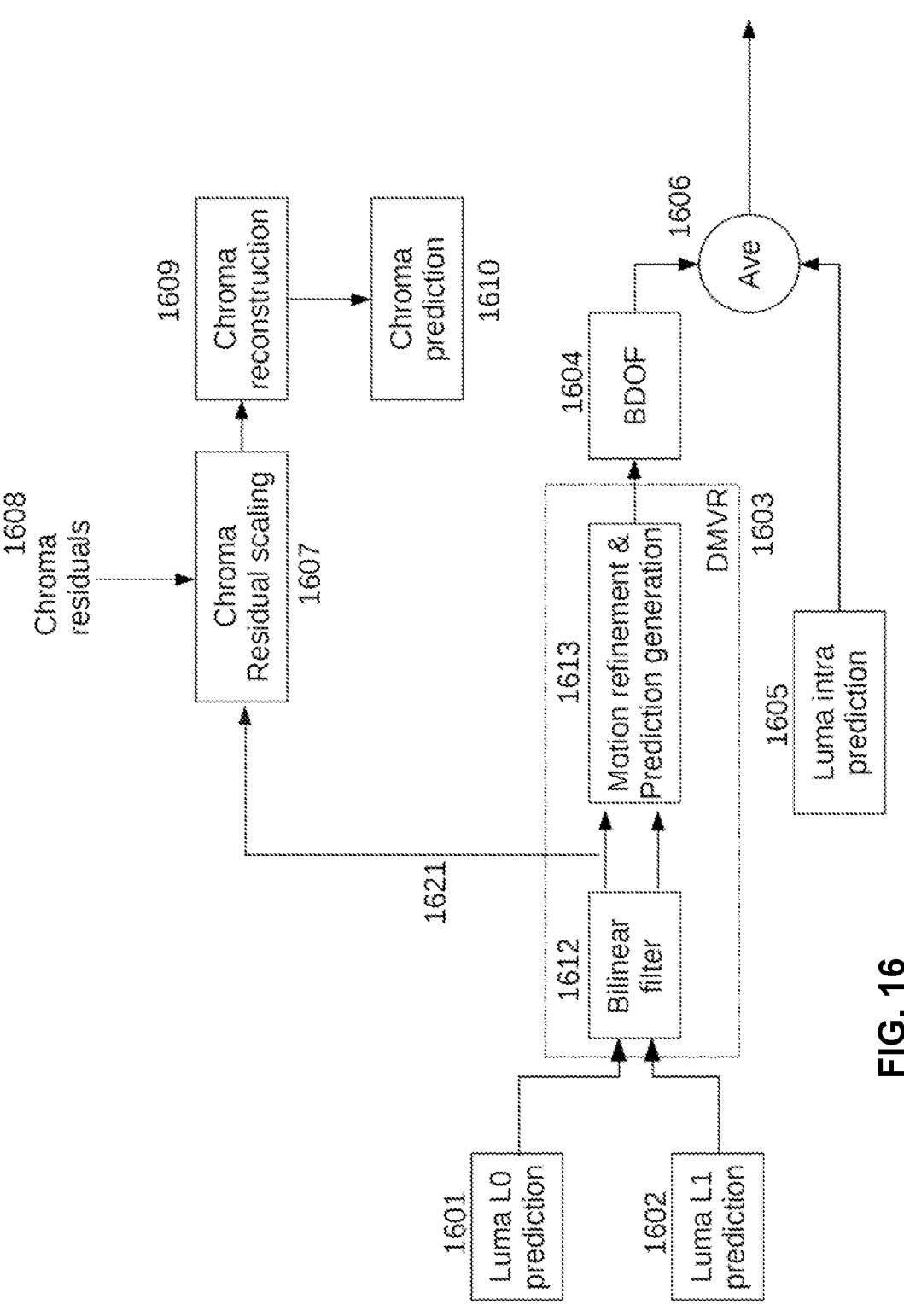
FIG. 16 is a flow chart illustrating the workflow of the LMCS decoding process in one other embodiment of the chroma residual sample reconstruction procedure.

FIG. 16 is a flow chart illustrating the workflow of the LMCS decoding process in one such other embodiment of the chroma residual sample reconstruction procedure. L0 prediction samples 1621 from the output of bilinear filter 1612 component of DMVR 1603 is used in chroma residual scaling 1607 for decoding one or more chroma residual samples.

In one example of one such other embodiment of the chroma residual sample reconstruction procedure, the chroma scaling factor is determined by shifting the luma samples output from bilinear filters to the original coding bit-depth of the input video as described in the box immediately following this paragraph.

---

If bitdepth is no larger than 10, then
$$P_{ave}(i, j) = P_0(i, j) >> (10 - bitdepth)$$
Otherwise,
$$P_{ave}(i, j) = P_0(i, j) << (bitdepth - 10)$$

---

Figure 17:
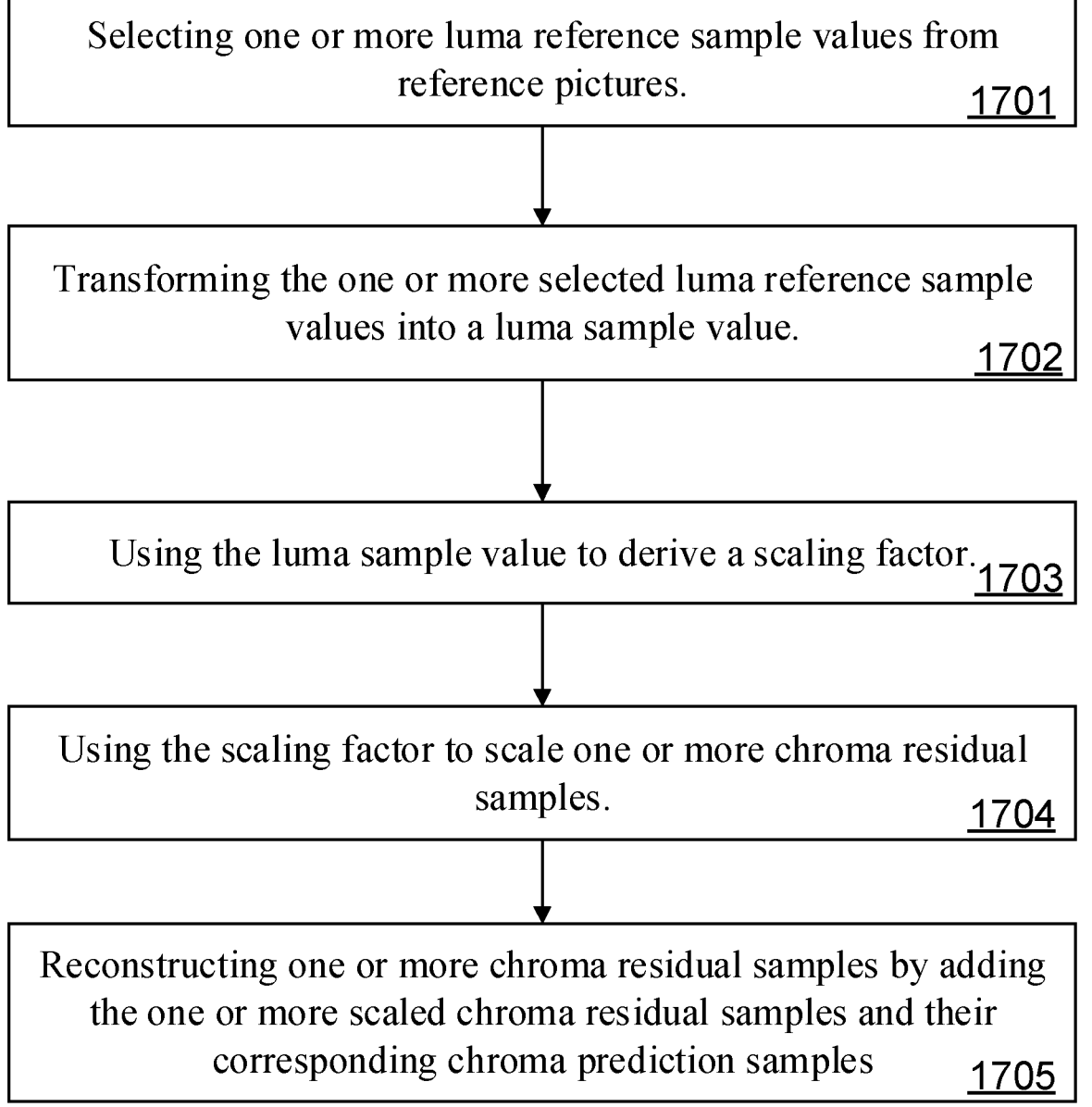
FIG. 17 is a flow chart illustrating the steps of a second chroma residual sample reconstruction procedure.

According to a second chroma residual sample reconstruction procedure, as illustrated in FIG. 17, one or more luma reference sample values are selected from reference pictures (1701), the one or more selected luma reference sample values are transformed into a luma sample value (1702), the transformed luma sample value is used to derive a scaling factor (1703), the scaling factor is used to scale one or more chroma residual samples (1704), and one or more chroma residual samples are reconstructed by adding the one or more scaled chroma residual samples and their corresponding chroma prediction samples (1705).

In one or more embodiments of the second chroma residual sample reconstruction procedure, selecting the one or more luma reference sample values from the reference pictures and transforming the one or more selected luma reference sample values into the luma sample value comprise obtaining both L0 and L1 luma reference sample values from L0 and L1 reference pictures and averaging the L0 and L1 luma reference sample values as the transformed luma sample value.

In other embodiments of the second chroma residual sample reconstruction procedure, selecting the one or more luma reference samples from the reference pictures and transforming the one or more selected luma reference samples into the luma sample value comprise selecting one luma reference sample value out of L0 and L1 luma reference sample values from L0 and L1 reference pictures and using the one selected luma reference sample values as the transformed luma sample value.

According to the existing LMCS design, the reconstructed luma samples neighboring to the 64×64 region where the current CU is located at are used for computing the chroma residual scaling factor for the CUs inside the region. Additionally, one clipping operation, i.e., Clip1( ), is applied to clip the reconstructed luma neighboring samples to the dynamic range of the internal bit-depth (i.e., in the range [0, (1<<bitDepth)−1] before the average is calculated.

Specifically, the method first fetches 64 left neighboring luma samples and 64 top neighboring luma samples of the corresponding 64×64 region that the current CU belongs to; then calculates the average, i.e., avgY, of the left and top neighboring samples and find the segment index $Y_{Idx}$ of avgY in the LMCS piecewise linear model; and finally derive the chroma residual $C_{ScaleInv}$=cScaleInv [$Y_{Idx}$].

Specifically, in the current VVC draft, how to derive the corresponding average luma is described as follows, where the application of Clip1( ) operation is shown with prominent font face and size:

For the derivation of the variable varScale the following ordered steps apply:

The variable invAvgLuma is derived as follows:

The array recLuma[i] with i=0 . . . (2*sizeY−1) and the variable cnt are derived as follows:

The variable cnt is set equal to 0.

When availL is equal to TRUE, the array recLuma[i] with i=0 . . . sizeY−1 is set equal to currPic[$xCuCb$−1][Min($yCuCb$+i,pic_height_in_luma_samples−1)]

27

28 with i=0 . . . sizeY−1, and cnt is set equal to sizeY. When availT is equal to TRUE, the array recLuma [cnt+i] with i=0 . . . sizeY−1 is set equal to currPic[Min(*xCuCb+i,pic*_width_in_luma_samples− 1)][*yCuCb*−1]

with i=0 . . . sizeY−1, and cnt is set equal to (cnt+sizeY).

The variable invAvgLuma is derived as follows:
If cnt is greater than 0, the following applies:

$$invAvgLuma = \text{Clip1}\left(\left(\sum_{k=0}^{cnt-1} recLuma[k] + (cnt \gg 1)\right) \gg \text{Log2}(cnt)\right)$$

Otherwise (cnt is equal to 0), the following applies:

invAvgLuma=1<<(BitDepth−1)

However, at the reconstruction process, after adding the prediction samples to the residual samples of one CU, the resulted sample values are already clipped to the dynamic range of the internal bit-depth. That means all the neighboring reconstructed luma samples around the current 64×64 region are guaranteed to be within the range of the internal bit-depth. Thus, their average, i.e., avgY, also cannot go beyond this range. As a result, the existing clipping (i.e., Clip1( )) is unnecessary to calculate the corresponding chroma residual scaling factor. To further reduce the complexity and memory requirements of the LMCS design, it is proposed to remove the clipping operation from when calculating the average of neighboring reconstructed luma samples to derive the chroma residual scaling factor.

FIG. 18 is a flow chart illustrating the steps of a non-clipping chroma residual scaling factor derivation procedure. In FIG. 18, a plurality of reconstructed luma samples from a first pre-determined region neighboring to a second pre-determined region wherein the CU is located is selected during decoding of a CU (1801), an average of the plurality of reconstructed luma samples is calculated (1802), and the average of the plurality of reconstructed luma samples is used directly, without any clipping, in deriving a chroma residual scaling factor for decoding the CU (1803).

In one or more embodiments of the non-clipping chroma residual scaling factor derivation procedure, the average of the plurality of reconstructed luma samples is the arithmetic average of the plurality of reconstructed luma samples.

In one or more embodiments of the non-clipping chroma residual scaling factor derivation procedure, using the average of the plurality of reconstructed luma samples directly, without any clipping, in deriving a chroma residual scaling factor for decoding the CU comprises identifying a segment index for the average in a pre-defined piecewise linear model and deriving the chrome residual scaling factor for decoding the CU based on the slope of the linear model of the segment.

In one or more embodiments of the non-clipping chroma residual scaling factor derivation procedure, the plurality of reconstructed luma samples in the first pre-determined region are generated by generating luma prediction samples and luma residual samples in the first pre-determined region, adding the luma residual samples to the luma prediction sample, and clipping the added luma samples to the dynamic range of the coding bit-depth.

In one or more embodiments of the non-clipping chroma residual scaling factor derivation procedure, the plurality of reconstructed luma samples is the plurality of forward mapped inter luma reconstructed samples.

In one or more embodiments of the non-clipping chroma residual scaling factor derivation procedure, the second pre-determined region is a 64×64 region wherein the CU is located.

In one example, as illustrated in FIG. 19, the first pre-determined region may include the top neighbor samples in the 1×64 region 1902 directly above the second pre-determined region 1904. Alternatively or additionally, the first pre-determined region may include the left neighbor samples in the 64×1 region 1903 directly to the left of the second pre-determined region 1904.

According to the existing LMCS design, the reconstructed samples both in original domain and mapped domain are used for the CUs that are coded in different modes. Correspondingly, multiple LMCS conversions are involved in the current encoding/decoding processes to convert the prediction and reconstruction luma samples between two domains.

Specifically, for the intra mode, the CIIP mode and the IBC mode, the reference samples from the neighboring reconstructed regions of one current CU that are used to generate intra prediction samples are maintained in the mapped domain. By contrast, for the CIIP mode and all the inter modes, the motion compensated prediction samples that are generated from temporal reference pictures are in the original domain. Because the luma reconstruction operation is performed in the mapped domain, those inter prediction samples of luma component need to be converted into the mapped domain before they are added with the residual samples. On the other hand, for both intra and inter modes, the inverse mapping is always applied to converted the reconstructed luma samples from the mapped domain back to the original domain.

Additionally, the clipping operation, i.e., Clip1( ), is applied to clip the inter prediction samples to the dynamic range of the internal bit-depth (i.e., in the range [0, (1<<bit-Depth)−1] after they are converted to the mapped domain. Meanwhile, for both intra and inter modes, the same clipping operation is also applied to the reconstructed luma samples after they are converted back to the original domain.

However, based on the existing LMCS design, there is one bit-stream constraint which guarantees that the resulting samples from the forward LMCS are always within the dynamic range of the internal bit-depth. This means that the mapped luma prediction samples of inter CUs cannot be beyond such dynamic range. Therefore, the existing clipping operation that is applied to the mapped luma prediction samples of inter mode is redundant.

More specifically, in the current LMCS design, the inverse mapping process for a luma sample is described as follows, where the application of the clipping operation is shown with prominent font face and size:

Input to this process is a luma sample lumaSample.

Output of this process is a modified luma sample invLumaSample.

The value of invLumaSample is derived as follows:

If slice_lmcs_enabled_flag of the slice that contains the luma sample lumaSample is equal to 1, the following ordered steps apply:

1. The variable idxYInv is derived by invoking the identification of piece-wise function index process for a luma sample as specified in clause 8.8.2.3 with lumaSample as the input and idxYInv as the output.

2. The variable invSample is derived as follows:

$$\text{invSample}=\text{InputPivot}[idxYInv]+(\text{InvScaleCoeff}[idxY\text{-}Inv]^*(\text{lumaSample}-\text{LmcsPivot}[idxYInv])+(1<<10))>>11 \qquad (1241)$$

3. The inverse mapped luma sample invLumaSample is derived as follows:

$$\text{invLumaSample}=\text{Clip1}(\text{invSample}) \qquad (1242)$$

Otherwise, invLumaSample is set equal to lumaSample.

Moreover, in the current LMCS design, the weighted sample prediction process for combined merge and intra prediction is described as follows, where the application of the clipping operation is shown with prominent font face and size:

Inputs to this process are:

a luma location (xCb, yCb) specifying the top-left sample of the current luma coding block relative to the top left luma sample of the current picture, the width of the current coding block cbWidth, the height of the current coding block cbHeight, two (cbWidth)×(cbHeight) arrays predSamplesInter and predSamplesIntra, a variable cIdx specifying the colour component index.

Output of this process is the (cbWidth)×(cbHeight) array predSamplesComb of prediction sample values.

The variable scallFact is derived as follows:

$$\text{scallFact}X=(cIdx==0||\text{SubWidth}C==1)?0:1 \qquad (1026)$$

$$\text{scallFact}Y=(cIdx==0||\text{SubHeight}C==1)?0:1 \qquad (1027)$$

The neighbouring luma locations (xNbA, yNbA) and (xNbB, yNbB) are set equal to $$(xCb-1,yCb-1+(cb\text{Height}<<\text{scallFact}Y)) \text{ and}$$

$$(xCb-1+(cb\text{Width}<<\text{scallFact}X),yCb-1), \text{ respectively.}$$

For X being replaced by either A or B, the variables availableX and isIntraCodedNeighbourX are derived as follows:

The derivation process for neighbouring block availability as specified in clause 6.4.4 is invoked with the location (xCurr, yCurr) set equal to (xCb, yCb), the neighbouring location (xNbY, yNbY) set equal to (xNbX, yNbX), checkPredModeY set equal to FALSE, and cIdx set equal to 0 as inputs, and the output is assigned to availableX.

The variable isIntraCodedNeighbourX is derived as follows:

If availableX is equal to TRUE and CuPredMode[0][xNbX][yNbX] is equal to MODE_INTRA, isIntraCodedNeighbourX is set equal to TRUE.

Otherwise, isIntraCodedNeighbourX is set equal to FALSE.

The weight w is derived as follows:

If isIntraCodedNeighbourA and isIntraCodedNeighbourB are both equal to TRUE, w is set equal to 3.

Otherwise, if isIntraCodedNeighbourA and isIntraCodedNeighbourB are both equal to FALSE, w is set equal to 1.

Otherwise, w is set equal to 2.

When cIdx is equal to 0 and slice_lmes_enabled_flag is equal to 1, predSamplesInter[x][y] with x=0 . . . cbWidth−1 and y=0 . . . cbHeight−1 are modified as follows:

$$idxY=\text{predSamplesInter}[x][y]>>\text{Log 2(OrgCW)}$$

$$\text{predSamplesInter}[x][y]=\text{Clip1}(\text{LmcsPivot}[idxY]+(\text{ScaleCoeff}[idxY]^*(\text{predSamplesInter}[x][y]-\text{InputPivot}[idxY])+(1<<10))>>11) \qquad (1028)$$

The prediction samples predSamplesComb[x][y] with x=0 . . . cbWidth−1 and y=0 . . . cbHeight−1 are derived as follows:

$$\text{predSamplesComb}[x][y]=(w^*\text{predSamplesIntra}[x][y]+(4-w)^*\text{predSamplesInter}[x][y]+2)>>2 \qquad (1029)$$

Furthermore, in the current LMCS design, the picture reconstruction with mapping process for luma samples is described as follows, where the application of the clipping operation is shown with prominent font face and size:

Inputs to this process are:

a location (xCurr, yCurr) of the top-left sample of the current block relative to the top-left sample of the current picture, a variable nCurrSw specifying the block width, a variable nCurrSh specifying the block height, an (nCurrSw)×(nCurrSh) array predSamples specifying the luma predicted samples of the current block, an (nCurrSw)×(nCurrSh) array resSamples specifying the luma residual samples of the current block. Outputs of this process is a reconstructed luma picture sample array recSamples.

The (nCurrSw)×(nCurrSh) array of mapped predicted luma samples predMapSamples is derived as follows:

If one of the following conditions is true, predMapSamples[i][j] is set equal to predSamples[i][j] for i=0 . . . nCurrSw−1, j=0 . . . nCurrSh−1:

CuPredMode[0][xCurr][yCurr] is equal to MODE_INTRA.

CuPredMode[0][xCurr][yCurr] is equal to MODE_IBC.

CuPredMode[0][xCurr][yCurr] is equal to MODE_PLT.

CuPredMode[0][xCurr][yCurr] is equal to MODE_INTER and ciip_flag[xCurr][yCurr] is equal to 1.

Otherwise (CuPredMode[0][xCurr][yCurr] is equal to MODE_INTER and ciip_flag[xCurr][yCurr] is equal to 0), the following applies:

$$idxY=\text{predSamples}[i][j]>>\text{Log 2(OrgCW)}$$

$$\text{predMapSamples}[i][j]=\text{Clip1}(\text{LmcsPivot}[idxY]+(\text{ScaleCoeff}[idxY]^*(\text{predSamples}[i][j]-\text{InputPivot}[idxY])+(1<<10))>>1) \qquad (1232)$$

with i=0 . . . nCurrSw−1, j=0 . . . nCurrSh−1)

The reconstructed luma picture sample recSamples is derived as follows:

$$\text{recSamples}[xCurr+i][yCurr+j]=\text{Clip1}(\text{predMapSamples}[i][j]+\text{resSamples}[i][j]) \qquad (1233)$$

with i=0 . . . nCurrSw−1, j=0 . . . nCurrSh−1

These redundant clipping operations incur extra requirement of computation complexity and on-chip memory in the existing LMCS design. To further reduce the complexity and memory requirements of the LMCS design, it is proposed to remove these redundant clipping operations.

According to a first aspect of the present application, as illustrated in FIG. 20, during decoding of a coding unit (CU) that is coded by an inter mode or Combined Inter and Intra Prediction (CIIP) mode under luma mapping with chroma scaling (LMCS) framework, a plurality of reconstructed samples of luma component is obtained in a mapped domain (2001), a plurality of converted samples of luma component is obtained in an original domain by converting the plurality of reconstructed samples of luma component from the mapped domain into the original domain (2002), and the plurality of converted samples of luma component is used in the original domain, without clipping, in deriving chroma scaling factors for decoding the chroma samples of the CU (2003).

In one or more embodiments of the first aspect of the present application, as illustrated in FIG. 21, when the CU is coded by an inter mode, obtaining the plurality of reconstructed samples of luma component in a mapped domain comprises calculating a plurality of inter prediction samples of luma component in the original domain (2101), converting the plurality of inter prediction samples of luma component from the original domain into the mapped domain, without clipping, to obtain a plurality of converted inter prediction samples of luma component in the mapped domain (2102), and adding the plurality of converted inter prediction samples of luma component in the mapped domain, to a plurality of residual samples of luma component in the mapped domain, resulting in the plurality of reconstructed samples of luma component in the mapped domain (2103).

In other one or more embodiments of the first aspect of the present application, as illustrated in FIG. 22, when the CU is coded by the CIIP mode, obtaining the plurality of reconstructed samples of luma component in a mapped domain comprises calculating a plurality of inter prediction samples of luma component in the original domain (2201), converting the plurality of inter prediction samples of luma component from the original domain into the mapped domain, without clipping, to obtain a plurality of converted inter prediction samples of luma component in the mapped domain (2202), calculating a plurality of intra prediction samples of luma component in the mapped domain (2203), deriving the prediction samples of luma component in the mapped domain by weighted average of the plurality of converted inter prediction samples and the plurality of intra prediction samples (2204), and adding the derived prediction samples of luma component in the mapped domain, to a plurality of residual samples of luma component in the mapped domain, resulting in the plurality of reconstructed samples of luma component in the mapped domain (2205).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the apparatus or system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

We claim:

1. A method for video decoding, comprising:
   during decoding of a coding unit (CU) that is coded by Combined Inter and Intra Prediction (CIIP) mode in a case where luma mapping with chroma scaling (LMCS) is enabled,
   obtaining a plurality of reconstructed samples of luma component in a mapped domain;
   obtaining a plurality of converted samples of luma component in an original domain by converting the plurality of reconstructed samples of luma component from the mapped domain into the original domain by applying inverse mapping for the LMCS; and
   deriving chroma scaling factors for decoding chroma samples of the CU by using a plurality of corresponding reconstructed samples of luma component, without clipping.

2. The method of claim 1, wherein when the CU is coded by the CIIP mode, obtaining the plurality of reconstructed samples of luma component in the mapped domain comprises:

calculating a plurality of inter prediction samples of luma component in the original domain;

converting the plurality of inter prediction samples of luma component from the original domain into the mapped domain, without clipping, to obtain a plurality of converted inter prediction samples of luma component in the mapped domain;

calculating a plurality of intra prediction samples of luma component in the mapped domain;

deriving prediction samples of luma component in the mapped domain by weighted average of the plurality of converted inter prediction samples and the plurality of intra prediction samples; and adding the derived prediction samples of luma component in the mapped domain, to a plurality of residual samples of luma component in the mapped domain, resulting in the plurality of reconstructed samples of luma component in the mapped domain.

3. The method according to claim 1, wherein a bit depth of video data to be decoded is equal to 14.

4. A method for storing a bitstream, comprising:

generating a bitstream by performing acts of the method according to claim 1; and storing the bitstream on a non-transitory computer readable storage medium.

5. The method according to claim 4, wherein a bit depth of video data to be decoded is equal to 14.

6. A computing device comprising:

one or more processors;

a non-transitory storage coupled to the one or more processors; and a plurality of programs stored in the non-transitory storage that, when executed by the one or more processors, cause the computing device to perform acts comprising:

during decoding of a coding unit (CU) that is coded by Combined Inter and Intra Prediction (CIIP) mode in a case where luma mapping with chroma scaling (LMCS) is enabled, obtaining a plurality of reconstructed samples of luma component in a mapped domain;

obtaining a plurality of converted samples of luma component in an original domain by converting the plurality of reconstructed samples of luma component from the mapped domain into the original domain by applying inverse mapping for the LMCS; and deriving chroma scaling factors for decoding chroma samples of the CU by using a plurality of corresponding reconstructed samples of luma component, without clipping.

7. The computing device of claim 6, wherein when the CU is coded by the CIIP mode, obtaining the plurality of reconstructed samples of luma component in the mapped domain comprises:

calculating a plurality of inter prediction samples of luma component in the original domain;

converting the plurality of inter prediction samples of luma component from the original domain into the mapped domain, without clipping, to obtain a plurality of converted inter prediction samples of luma component in the mapped domain;

calculating a plurality of intra prediction samples of luma component in the mapped domain;

deriving prediction samples of luma component in the mapped domain by weighted average of the plurality of converted inter prediction samples and the plurality of intra prediction samples; and adding the derived prediction samples of luma component in the mapped domain, to a plurality of residual samples of luma component in the mapped domain, resulting in the plurality of reconstructed samples of luma component in the mapped domain.

8. The computing device according to claim 7, wherein a bit depth of video data to be decoded is equal to 14.

9. A non-transitory computer readable storage medium storing a plurality of programs for execution by a computing device having one or more processors, wherein the plurality of programs, when executed by the one or more processors, cause the computing device to perform acts comprising:

during decoding of a coding unit (CU) that is coded by Combined Inter and Intra Prediction (CIIP) mode in a case where luma mapping with chroma scaling (LMCS) is enabled, obtaining a plurality of reconstructed samples of luma component in a mapped domain;

obtaining a plurality of converted samples of luma component in an original domain by converting the plurality of reconstructed samples of luma component from the mapped domain into the original domain by applying inverse mapping for the LMCS; and deriving chroma scaling factors for decoding chroma samples of the CU by using a plurality of corresponding reconstructed samples of luma component, without clipping.

10. The non-transitory computer readable storage medium of claim 9, wherein when the CU is coded by the CIIP mode, obtaining the plurality of reconstructed samples of luma component in the mapped domain comprises:

calculating a plurality of inter prediction samples of luma component in the original domain;

converting the plurality of inter prediction samples of luma component from the original domain into the mapped domain, without clipping, to obtain a plurality of converted inter prediction samples of luma component in the mapped domain;

calculating a plurality of intra prediction samples of luma component in the mapped domain;

deriving prediction samples of luma component in the mapped domain by weighted average of the plurality of converted inter prediction samples and the plurality of intra prediction samples; and adding the derived prediction samples of luma component in the mapped domain, to a plurality of residual samples of luma component in the mapped domain, resulting in the plurality of reconstructed samples of luma component in the mapped domain.

* * * * *